United States Patent
Oh et al.

(10) Patent No.: US 10,984,504 B2
(45) Date of Patent: Apr. 20, 2021

(54) ADVANCED DEMOSAICING WITH ANGLE COMPENSATION AND DEFECTIVE PIXEL CORRECTION

(71) Applicant: Intel Corporation, Santa Clara, CA (US)

(72) Inventors: Jong Dae Oh, San Jose, CA (US); Vijay Sundaram, San Jose, CA (US); Jingyang Xue, Santa Clara, CA (US); Yi-Jen Chiu, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 134 days.

(21) Appl. No.: 16/453,652

(22) Filed: Jun. 26, 2019

(65) Prior Publication Data
US 2019/0318452 A1    Oct. 17, 2019

(51) Int. Cl.
| G06K 9/00 | (2006.01) |
| G06T 3/40 | (2006.01) |
| G06T 7/90 | (2017.01) |

(52) U.S. Cl.
CPC ............. G06T 3/4015 (2013.01); G06T 7/90 (2017.01); *G06T 2207/10024* (2013.01)

(58) Field of Classification Search
CPC ............... G06T 3/4015; G06T 7/90; G06T 2207/10024; G06T 5/002; H04N 1/60; H04N 9/69; H04N 9/73; H04N 9/735
See application file for complete search history.

(56) References Cited

U.S. PATENT DOCUMENTS

2013/0077858 A1* 3/2013 Peng .................... G06T 3/4015
                                                    382/162
2017/0039682 A1* 2/2017 Oh ....................... G06T 3/4015

* cited by examiner

*Primary Examiner* — Dhaval V Patel
(74) *Attorney, Agent, or Firm* — Green, Howard & Mughal LLP

(57) ABSTRACT

Techniques related to demosaicing for digital image processing are discussed. Such techniques include correcting defective pixels by detecting hot and warm pixels and correcting such detected hot and warm pixels based on neighboring pixels and angle compensation including detecting dominant angles and compensating for such detected angles during demosaicing.

24 Claims, 14 Drawing Sheets

ADVANCED DEMOSAICING WITH ANGLE COMPENSATION AND DEFECTIVE PIXEL CORRECTION

BACKGROUND

Demosaicing techniques reconstruct full color image from incomplete color samples output from an image sensor overlaid with a color filter array (CFA). For example, demosaicing may be an important operation in a camera or imaging pipeline. Current techniques for performing demosaicing include spatial interpolation, frequency domain approaches, and example based demosaicing.

For example, spatial interpolation techniques may leverage the fact that the color channels are highly correlated to reconstruct the full color image. Frequency domain approaches such as frequency domain interpolation may use the known CFA sampling pattern to separate luminance and chrominance terms by applying appropriate filters. Example based demosaicing may include learning the relationship between the CFA pattern and surrounding pixels.

It is an ongoing concern to improve image demosaicing to attain higher quality images both in subjective and objective terms. It is with respect to these and other considerations that the present improvements have been needed. Such improvements may become critical as the desire to attain high quality images becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
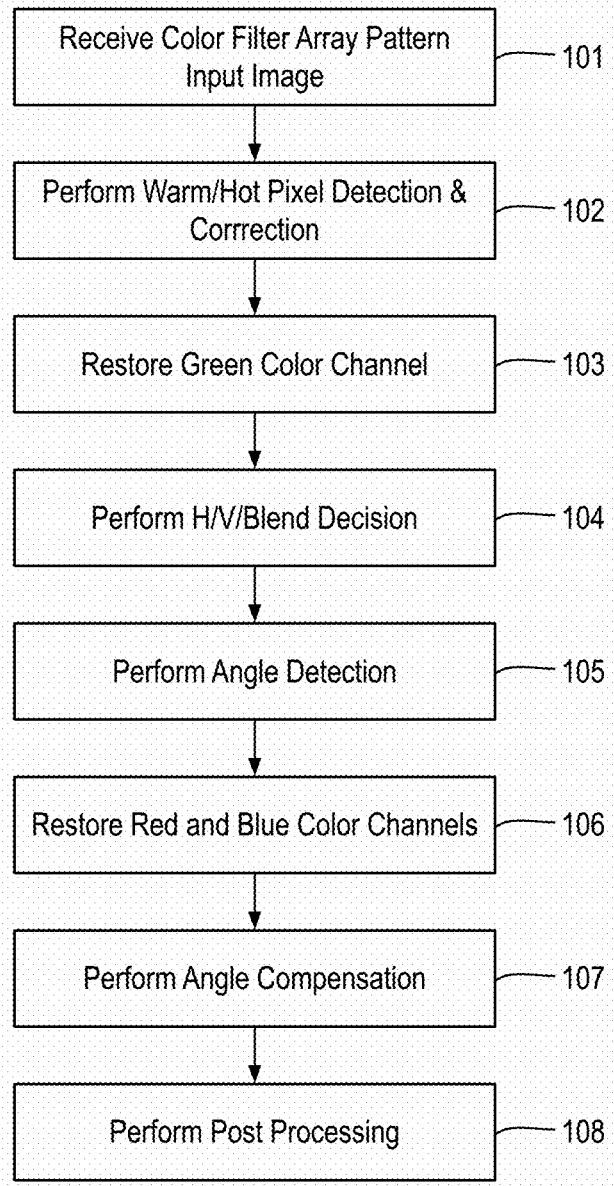
FIG. 1 illustrates an example process for demosaicing a color filter array image to generate a full color image.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", or examples, or embodiments, etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to image demosaicing and, in particular, to demosaicing with defective pixel correction, adaptive horizontal, vertical, or blend interpolation selection, and angle compensation.

As described above, it may be advantageous to provide high quality demosaicing in imaging systems. Furthermore, it may be advantageous for such demosaicing to be fast and efficient. The techniques discussed herein provide for conversion of a pattern of pixel samples generated based on a color filter array (CFA) such as a Bayer pattern to a fully reconstructed full color image. As used herein, the term full color image indicates an image having a red (R), a green (G), and a blue (B) value for each pixel thereof. Notably, data from an image sensor may have only one pixel value (e.g., red, green, or blue) for each pixel and the remaining values are determined using the techniques discussed herein. In some embodiments, the CFA has a Bayer pattern, although any suitable pattern may be used.

The disclosed techniques may be incorporated in any suitable processing context such as an image processing pipeline. In some embodiments, the disclosed techniques are performed in hardware, such as an image or graphics processor. As discussed, the disclosed techniques may convert a CFA image or CFA image data such as CFA image data in a Bayer pattern (e.g., a single color pixel value per pixel) to full image data (e.g., three color pixel values per pixel). The techniques discussed herein include detection and compensation for horizontal and vertical (H/V, 0°/90°) edges and edges that are off horizontal and vertical such as 27°, 45°, and 63° edges. The techniques discussed herein also include hot and warm pixel detection and compensation based on noise level. Such techniques achieve higher subjective and objective image quality for improved image processing performance.

FIG. 1 illustrates an example process 100 for demosaicing a color filter array image to generate a full color image, arranged in accordance with at least some implementations of the present disclosure. Process 100 may include one or more operations 101-108 as illustrated in FIG. 1. Process 100 or portions thereof may be performed by any device or system discussed herein to perform demosaicing for color filter array image data from an image sensor or image preprocessor. Process 100 or portions thereof may be repeated for any number such images.

As shown, process 100 may begin at operation 101, where a color filter array image is received. The color filter array image may include any suitable image data associated with a raw (non-demosaiced) image such as a single pixel value for each pixel of the color filter array image. As used herein, the term color filter array image indicates a non-demosaiced image and the color filter array image may be received, for example, from an image sensor or from a preprocessor. As discussed, in some embodiments, the color filter array image includes a single pixel value for each pixel such that each pixel corresponds to a color (e.g., R, G, or B) of the color filter array. Process 100 generates a full color image based on the a color filter array image such that the full color image has three pixel values (e.g., R, G, and B) for each pixel thereof.

Processing continues at operation 102, where warm and hot pixel detection and correction are performed. In some embodiments, warm and hot pixel detection is performed for each pixel of the color filter array image. If a warm or hot pixel is detected, the pixel is corrected as discussed herein. If not, no change is made to the pixel. As used herein, the term pixel indicates a location in an image and corresponding one or more color values. Such one or more color values may also be characterized as pixel values. As used herein, the term warm pixel indicates a pixel that has a different color value as compare to neighbor pixels of the warm pixel. For example, a warm pixel is usually a bright pixel around dark neighbor pixels. Furthermore, the difference between a warm pixel and neighbor pixels is smaller than the difference between a hot pixel and neighbor pixels. As used herein, the term hot pixel indicates a pixel that has a different color value as compare to neighbor pixels of the hot pixel such that a hot pixel has a greater difference with its neighbors than a warm pixel.

Figure 2:
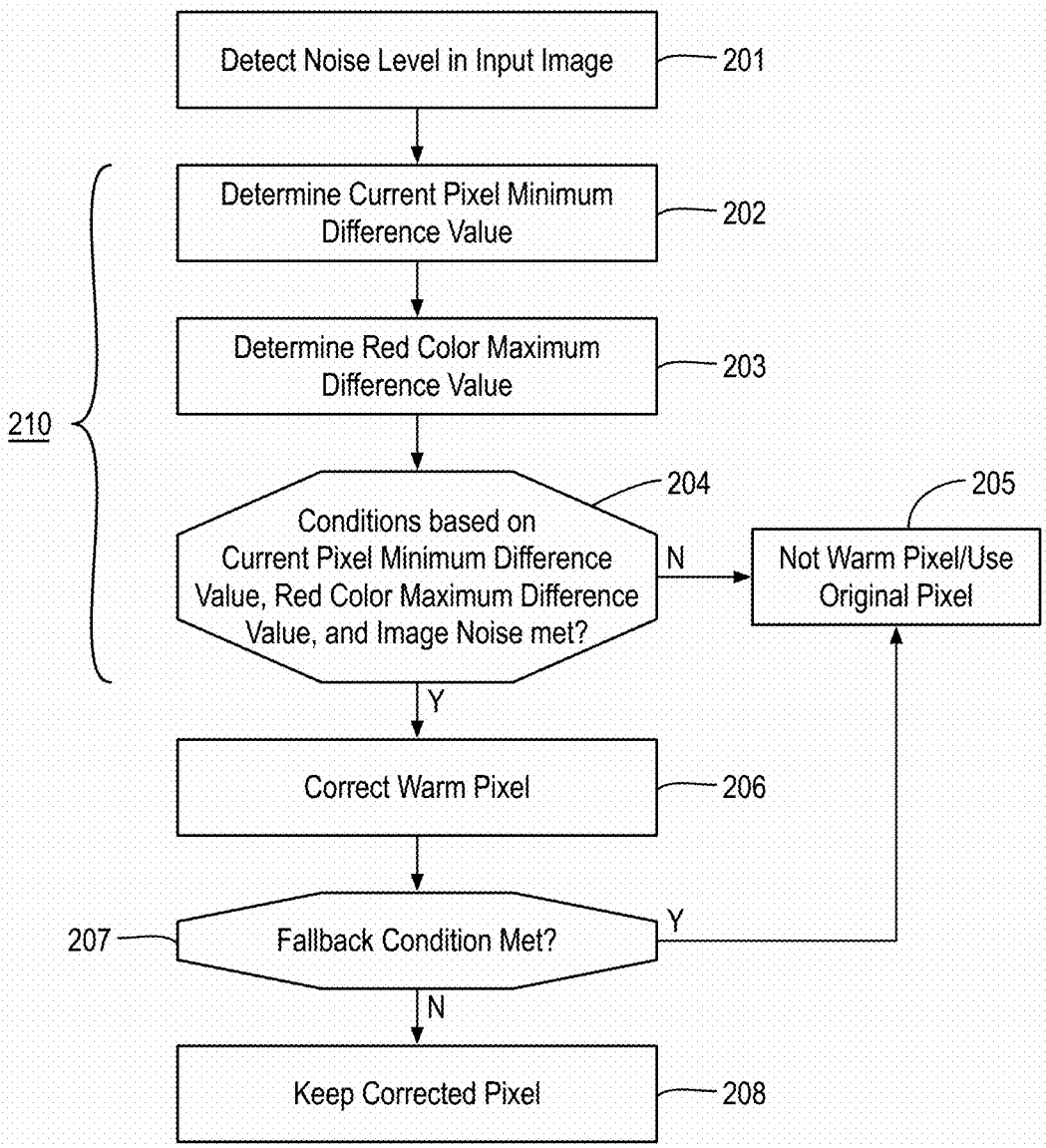
FIG. 2 illustrates an example process for detecting and correcting warm pixels.

FIG. 2 illustrates an example process 200 for detecting and correcting warm pixels, arranged in accordance with at least some implementations of the present disclosure. Process 200 may include one or more operations 201-208 as illustrated in FIG. 2. Process 200 or portions thereof may be performed by a device to detect and correct warm pixels. Process 200 or portions thereof may be repeated for any number of pixels of an input image such as a color filter array image.

As shown, process 200 may begin at operation 201, where a noise level in the input color filter array image is detected. The noise level may be detected using any suitable technique or techniques and the noise level may be any suitable value such as a scalar value indicative of noise in the color filter array image. In some embodiments, two metrics are used for noise level. In some embodiments, the metrics are generated based on only a portion of the input image (e.g., the first five block noise estimation blocks) and are then used for the entire input image. In some embodiments, the first noise level metric is a BNE (block noise estimation) average value that is generated based on a first number of BNE blocks (e.g., five blocks). In some embodiments, a block noise estimation is made for each block (of any size such as 16×4 pixels) of the input color filter array image and an average of such block-wise values is generated to provide the BNE value. In some embodiments, either or both of block-wise a minimum BNE values (e.g., 0) and a maximum BNE value (e.g., 255) are excluded from the BNE average calculation. In an embodiment, BNE may be determined as part of de-noise processing for the input color filter array image.

In some embodiments, the second noise level metric is a sum of Min_Max values for the BNE blocks. In an embodiment, the Min_Max values may be determined as shown in Equations (1):

Sum_Min_Max=16−max(Max_Max,Max_Min)

Max_Max=max(Max_Loc[0],Max_Loc[1],Max_Loc[2],Max_Loc[3])

Max_Min=max(Min_Loc[0],Min_Loc[1],Min_Loc[2],Min_Loc[3])    (1)

where Sum_Min_Max is the sum of minimum and maximum values for a first number of BNE blocks (e.g., 5 BNE blocks), Max_Loc[x] and Min_Loc[x] are counters for four positions in 2 by 2 blocks, location [0] is top left of the 2 by 2 block, location [1] is top right of the 2 by 2 block, location [2] is bottom left of the 2 by 2 block, and location [3] is bottom right of the 2 by 2 block.

In some embodiments, each 16 by 4 block (e.g., a BNE block) has one BNE value (which are averaged as discussed above). In an embodiment, there are 16 2 by 2 blocks in each 16 by 4 BNE block. Therefore, the maximum value for both Max_Max and Max_Min is 16 (as shown in Equations (1)). If TL intensity is larger (smaller) than TR, BL, and BR, Max_Loc[0] (Min_Loc[0]) is increased by 1, and similarly for each of TR, BL, and BR. As shown in Pseudocode (2), a condition may be applied to exclude small variations in 2 by 2 blocks and any too dark pixel in noise level detection:

if (abs(Max_Value/16−Min_Value/16)*
15<(Max_Value/16+Min_Value/16)∥
(Max_Value/16+Min_Value/16)<4)

then {Max_Max=Max_Min=16;$m\_b$Color=false;}  (2)

where Max_Value is the maximum value in the BNE block, Min_Value is the minimum value in the BNE bloc, and m_bColor provides a flag to indicate whether the input image is a non-noisy image. As is discussed further herein below, m_bColor may be used to determine a noise profile in decision mapping for demosaicing.

Furthermore, a final value for noise level in the input color filter array image may be determined as shown in Equation (3):

Avg_BNE=max(Sum of BNE,Sum of Min_Max*5)/5  (3)

where Avg_BNE is the average block noise estimation based on the first five BNE blocks (and used as representative for the entire input image).

As is discussed further herein below, using Avg_BNE, parameter values and window size in demosaicing decisions may be discussed with respect to process 200 may be used in other processing.

Processing continues at operation group 210, where initial warm pixel detection is performed. In particular, operation group 210 includes operation 202, where, for a current pixel of a color filter array image, a current pixel minimum difference value is determined.

Figure 3:
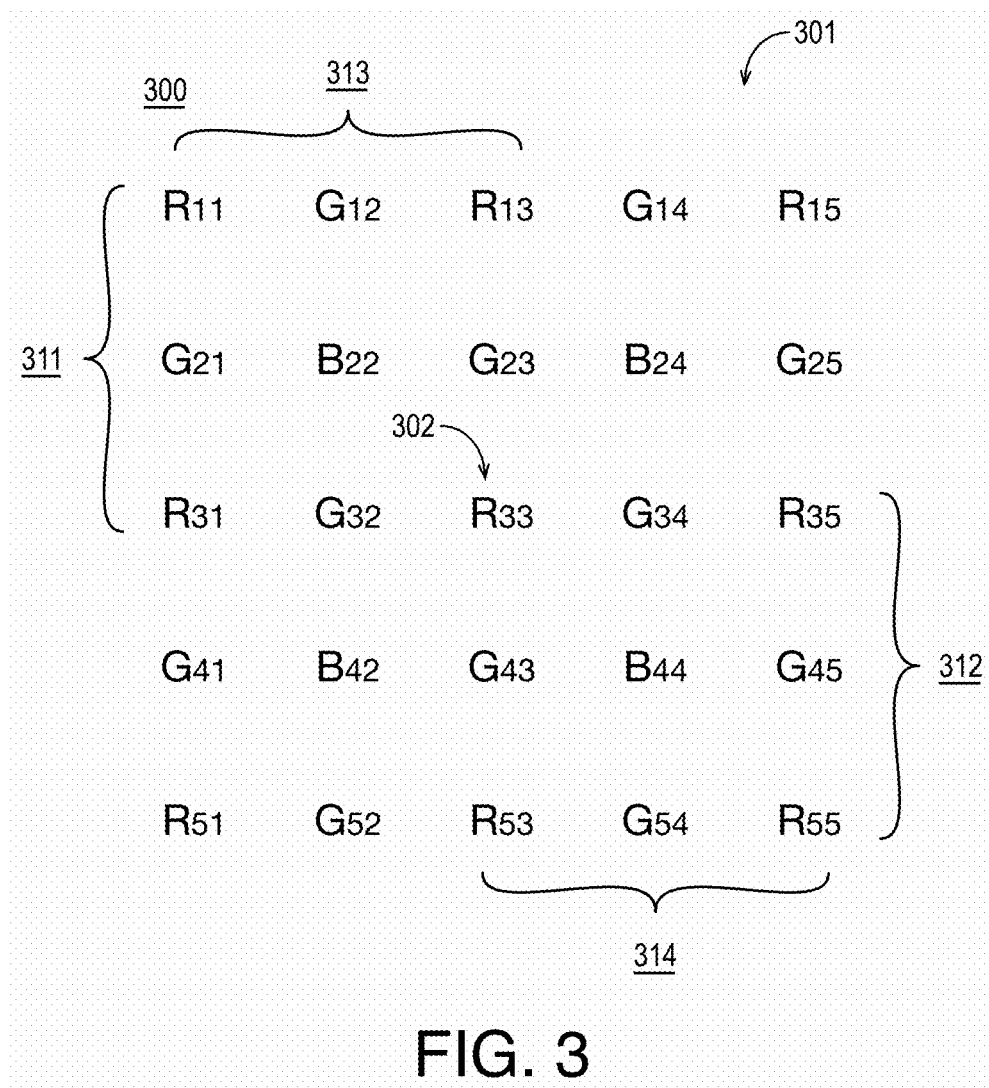
FIG. 3 illustrates an example color filter array image neighborhood.

FIG. 3 illustrates an example color filter array image neighborhood 300, arranged in accordance with at least some implementations of the present disclosure. As shown in FIG. 3, neighborhood 300 includes pixels 301 such that each pixel includes one pixel value for a particular color as indicated by the pixel index associated therewith. For example, for a current pixel 302, around which neighborhood 300 is centered, color filter array image includes a red color pixel value, R33. In the illustrated embodiment, neighborhood 300 includes 25 pixels 301 in a Bayer pattern centered around a red pixel 302. However, neighborhood 300 may be any suitable size and have any suitable CFA pattern. Furthermore, the discussed techniques are described with respect to red pixel 302 (which is characterized as a current or target pixel), but such techniques may be extended to blue and green pixels.

Returning to FIG. 2, as discussed, at operation 202, a current pixel minimum difference value is determined for a current pixel (e.g., pixel 302). The current pixel minimum difference value represents a minimum difference between the current pixel (e.g., the center pixel of a neighborhood) and a those pixels in the neighborhood having the same color as the current pixel. In some embodiments, the current pixel minimum difference value is determined as shown in Equation (4):

Min_Diff=Min(abs($R33$−$R11$),abs($R33$−$R13$),abs
($R33$−$R15$),abs($R33$−$R31$),abs($R33$−$R35$),abs
($R33$−$R51$),abs($R33$−$R53$),abs($R33$−$R55$))  (4)

where Min_Diff is the current pixel minimum difference value, R33 is the pixel value of the current pixel, R11 is a pixel value of the same color above and to the left of the current pixel, R13 is a pixel value of the same color above the current pixel, and so on, with the following orientations relative to the current pixel also shown in Equation (4): above and to the right (R15), to the left (R31), to the right (R35), below and to the left (R51), below (R53), and below and to the right (R55).

Figure 4:
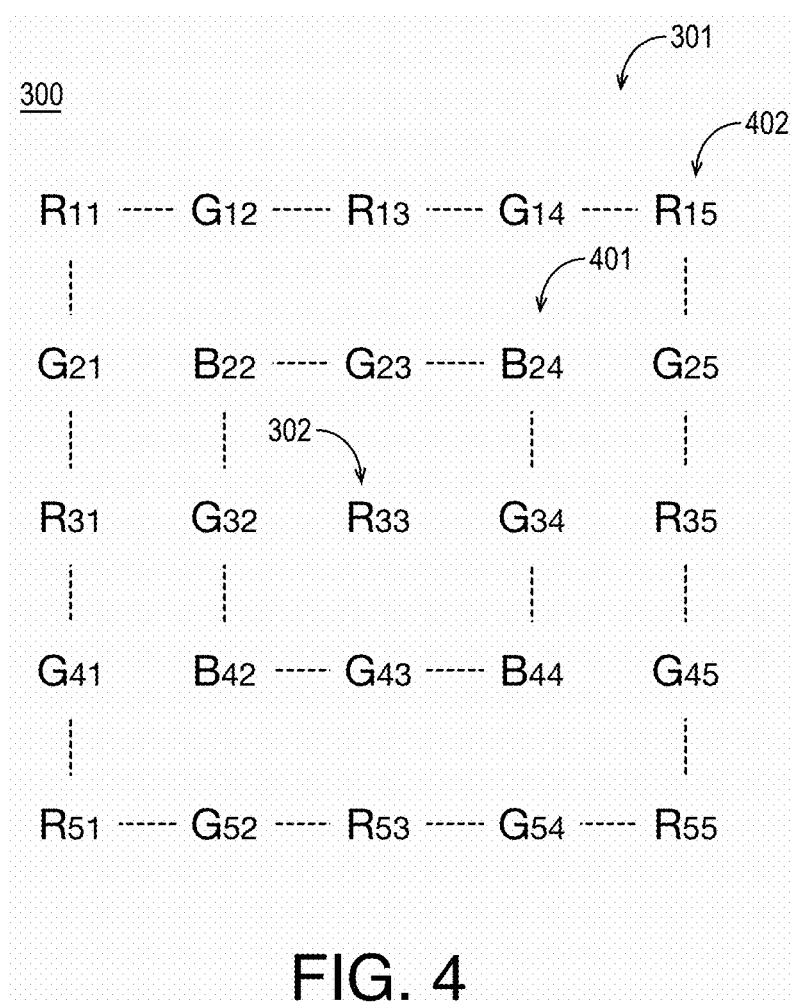
FIG. 4 illustrates example color filter array image neighborhood with various neighborhood regions.

FIG. 4 illustrates example color filter array image neighborhood 300 with various neighborhood regions, arranged in accordance with at least some implementations of the present disclosure. As shown in FIG. 4, relative to pixel 302 (e.g., a current or target pixel), pixels 401 are immediate neighbors to pixel 302. As used herein, the term immediate neighbor indicates there are no intervening pixels between the immediate neighbor. Pixels 401 are also characterized as a first layer or a primary layer relative to pixel 302 such that no intervening pixels are between pixel 302 and the first layer of pixels 401.

Furthermore, relative to pixel 302 (e.g., a current or target pixel), pixels 402 are secondary neighbors to pixel 302. As used herein, the term secondary neighbor indicates there is one and only one intervening pixel or layer of pixels between each the pixel and the secondary neighbors. Pixels 402 are also characterized as a second layer or a secondary layer relative to pixel 302 such that no intervening pixels are between pixel 302 and the first layer of pixels 401. Although illustrated with two layers around pixel 302 in neighborhood 300, any number of layers may be used.

Notably, FIGS. 3 and 4 also illustrate the colors and locations of pixels 301 relative to a grid system (with top left being 11) such that each pixel value is indicated by its row (first value) and column (second value) given relative to the color of the pixel (R, G, B) such that the color is the value off the image sensor as covered by a CFA). Such notation is used throughout the present disclosure. Furthermore, the relative positions within neighborhood 300 may be described relative to a pixel with direction (e.g., above and to the right, to the right, etc.) or relative to neighborhood 300 (e.g., R11 is the top left pixel, R13 is the top center pixel, and so on). Furthermore, as used herein, the term neighbor pixels of a particular color indicate only those neighbors of that color (e.g., red neighbor pixels, blue neighbor pixels, green neighbor pixels, or more generally neighbor pixels of a first, second, third, etc. color).

Returning to operation group 210 of FIG. 2, processing continues at operation 203, where a red color maximum difference value is determined for the current pixel (e.g., pixel 302). Notably, the color maximum difference value matches the color of the current pixel and may be green or blue for other pixels. The color maximum difference value represents a maximum difference within the neighborhood of the current pixel for the color of the current pixel. In some embodiments, the color maximum difference value is determined as shown in Equation (5):

Max_Diff=Max(abs($R11$−$R13$),abs($R13$−$R15$),abs
($R51$−$R53$),abs($R53$−$R55$),abs($R11$−$R31$),abs
($R31$−$R51$),abs($R15$−$R35$),abs($R35$−$R55$))  (5)

where Max_Diff is the color maximum difference value, R11 is the pixel value of the top left pixel in the pixel neighborhood, R13 is the pixel value of the top center pixel in the pixel neighborhood, and so on with the following orientations relative to the pixel neighborhood also shown in Equation (5): top right (R15), bottom left (R51), bottom center (R53), and bottom right (R55). Such orientations with respect to pixel 302 and/or neighborhood will not generally be provided in the following discussion for the sake of brevity.

Processing continues at decision operation 204, where a determination is made as to whether, based on the current pixel minimum difference value, the color maximum difference value, and the image noise of the input color filter array image, the current pixel is a warm pixel. If not, processing continues at operation 205, where the pixel is deemed not a warm pixel and another current pixel is selected for processing as discussed, beginning with operation 202 (e.g., the pixel is not modified and processing moves to a next pixel). If so, processing continues at operation 206 as discussed further below.

The determination made at operation 204 is based on the current pixel minimum difference value, the color maximum difference value, and the image noise of the input color filter array image. Notably, since warm pixels tend to be detected in high noise images and in dark areas of such images, the conditions for deeming a warm pixel may focus on high noise images and dark areas. In some embodiments, the condition applied at operation 204 deems a warm pixel in response to the red color maximum difference value being less than the current pixel minimum difference value, a noise level of the color filter array image exceeding a first threshold, and the red color maximum difference value and the current pixel minimum difference value both not exceeding a second threshold.

In some embodiments, there are two conditions that must be satisfied for the current pixel to be detected as a warm pixel. In some embodiments, the first condition is satisfied when Max_Diff (e.g., the color maximum difference value) is smaller than Min_Diff (e.g., the current pixel minimum difference value) and Avg_BNE (e.g., a noise level of the input image) is larger than High_Noise_TH (e.g., a predetermined threshold to indicate large noise in the input image). In some embodiments, the second condition is satisfied when Max_Diff<Min_Diff (e.g., the color maximum difference value is less than the current pixel minimum difference value) and Min_Diff<10 (e.g., the current pixel minimum difference value is less than a predetermined threshold). Although illustrated with respect to detecting a warm pixel when both conditions are met, in some embodiments, a warm pixel is detected when either condition is met.

When the discussed conditions are met, processing continues at operation 206, where the warm pixel is corrected. The warm pixel may be corrected using any suitable technique or techniques. In some embodiments, the current pixel is corrected to a corrected current pixel in response to the current pixel being detected as a warm pixel such that the corrected current pixel is based on neighbor pixels of the current pixel of the same color. In an embodiment, the corrected current pixel is an average of at least some of the red (e.g., same color) neighbor pixels. In an embodiment, the corrected current pixel is determined as shown in Equation (6):

$$R33=(R13+R31+R35+R53)/4 \qquad (6)$$

where R33 is the corrected current pixel generated as an average of all other red pixels in pixel neighborhood 300 having the same color as current pixel 302.

Processing optionally continues at decision operation 207, where a determination is made as to whether any fallback conditions apply to the current pixel. If so, processing continues at operation 205, where the original pixel is used (e.g., the pixel is reset to the original pixel value). If not, processing continues at operation 208 where the corrected pixel value is kept. In either event, processing continues with a next pixel being selected and processed as discussed until all pixels of the input image have been processed.

The fallback conditions applied at operation 207 may include any suitable fallback conditions that limit the over-correction of warm pixels in the input image. In an embodiment, two fallback conditions are applied.

In some embodiments, the first fallback condition uses a counter such that the counter is increased by one (i.e., incremented) when a difference between a same color pixel value (e.g., in second layer of pixels 402) and the current pixel (e.g., pixel 302) is larger than a difference between the current pixel (e.g., pixel 302) and the pixel value in the middle of (i.e., between) the current pixel (e.g., pixel 302) and the same color pixel. For example, with reference to FIG. 4, if abs(R33−R11)>abs(R33−B22), the counter is increased by 1. That is, each instance of a difference between the current pixel (pixel 302) and one of the secondary neighbor pixels having the same color (e.g., any of R11, R13, R15, R31, R35, R51, R53, R55) exceeding a difference between the current pixel (pixel 302) and an intervening pixel of one of the primary neighbor pixels (e.g., any of B22, G23, B24, G32, G34, B42, G43, B44, respectively) is counted to generate a count (or count value). If the count is larger than a threshold, the pixel value is reset to the original pixel value. If not, the updated pixel value is used.

In some embodiments, the second fallback condition uses the current pixel minimum difference value discussed with respect to operation 202. In some embodiments, if the current image is a noisy image and the current pixel (e.g., pixel 302) minimum difference value (e.g., the minimum difference between the current pixel and the same color in second layer of pixels 402) is larger than a minimum difference between the current pixel (e.g., pixel 302) and the eight immediately neighboring first layer pixels 401 and the image is a noisy image, the pixel value is reset to the original pixel value. If not, the updated pixel value is used. For example, a second current pixel minimum difference value based on differences between the current pixel (e.g., pixel 302) and immediately neighboring pixels within the neighborhood (e.g., pixels 401) is determined and the current pixel (pixel 302) is reset from the corrected current pixel (to the original pixel value) in response to the current pixel minimum difference value (e.g., as determined with respect to operation 202) exceeds the second current pixel minimum difference value and the noise level of the input color filter array image exceeding a threshold. In some embodiments, the threshold may be the same as that used to determine whether the pixel is a warm pixel (e.g., at operation 204). In some embodiments, the threshold is greater than the threshold used at operation 204.

Although discussed with respect to fallback conditions being performed after warm pixel correction, in some embodiments, such fallback conditions may be checked prior to warm pixel correction at operation 206.

Returning to FIG. 1, processing may continue at operation 103 after the correction of such warm pixels. Furthermore, operation 102 may optionally perform hot pixel detection and correction as follows.

Figure 5:
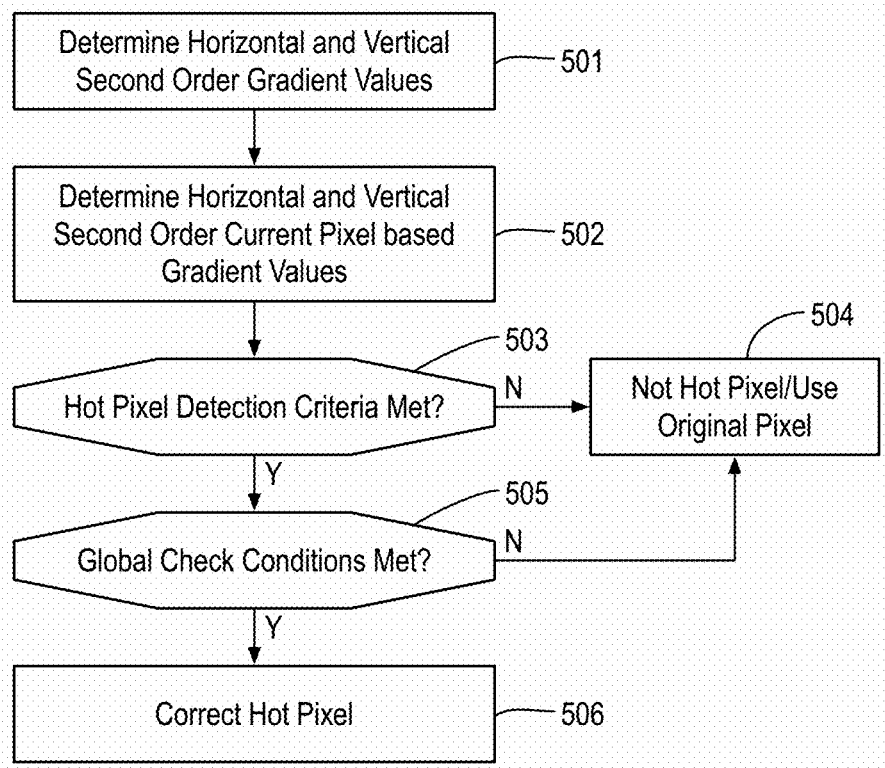
FIG. 5 illustrates an example process for detecting and correcting hot pixels.

FIG. 5 illustrates an example process 500 for detecting and correcting hot pixels, arranged in accordance with at least some implementations of the present disclosure. Process 500 may include one or more operations 501-506 as illustrated in FIG. 5. Process 500 or portions thereof may be performed by a device to detect and correct hot pixels. Process 500 or portions thereof may be repeated for any number of pixels of an input image such as a color filter array image.

As shown, process 500 may begin at operation 501, where, for a current pixel, a horizontal and a vertical second order gradient values (e.g., two second order gradient values) are determined. The horizontal and a vertical second order gradients represent changes in differences across a pixel neighborhood (e.g., differences of differences) for a particular color (e.g., the color of the pixel). In some embodiments, the horizontal and a vertical second order gradient values are determined as shown with respect to Equations (7):

Diff_$H2$=Min(abs($H\_D$[0]−$H\_D$[2]),abs($H\_D$[0]−$H\_D$[3]),abs($H\_D$[1]−$H\_D$[2]),abs($H\_D$[1]−$H\_D$[3]))

Diff_$V2$=Min(abs($V\_D$[0]−$V\_D$[2]),abs($V\_D$[0]−$V\_D$[3]),abs($V\_D$[1]−$V\_D$[2]),abs($V\_D$[1]−$V\_D$[3]))  (7)

where Diff_H2 is the horizontal second order gradient, Diff_V2 is the vertical second order gradient, and H_D and V_D values are gradient values determined as shown in Equations (8) as follows:

$H\_D$[0]=$R$11−$R$13

$H\_D$[1]=$R$13−$R$15

$H\_D$[2]=$R$51−$R$53

$H\_D$[3]=$R$53−$R$55

$V\_D$[0]=$R$11−$R$31

$V\_D$[1]=$R$31−$R$51

$V\_D$[2]=$R$15−$R$35

$V\_D$[3]=$R$35−$R$55  (8)

where H_D are horizontal gradient values and V_D are vertical gradient values.

As shown, the horizontal second order first color gradient value for a current pixel is determined based on minimums of differences (e.g., H_D[0]−H_D[2], H_D[0]−H_D[3], and so on) between differences between pixels within neighborhood 300 (e.g., H_D [0]=R11−R13, H_D [2]=R51−R53, H_D [3]=R53−R55, and so on) exclusive of the current pixel (e.g., such that pixel 302 is not used). Similarly, the vertical second order first color gradient value for a current pixel is determined based on minimums of differences (e.g., V_D [0]−V_D[2], V_D[0]−V_D[3], and so on) between differences between pixels within neighborhood 300 (e.g., V_D [0]=R11−R31, V_D [2]=R15−R35, V_D [3]=R35−R55, and so on) exclusive of the current pixel (e.g., such that pixel 302 is not used).

Processing continues at operation 502, where, for the current pixel, horizontal and a vertical second order current pixel based gradient values (e.g., two second order current pixel based gradient values) are determined. The horizontal and a vertical second order pixel based gradients represent changes in differences with respect to the pixel neighborhood (e.g., differences of differences) for the particular color of the pixel. Notably, the horizontal and vertical second order current pixel based gradient values use the current pixel (e.g., pixel 302) and pixels of the same color. In some embodiments, the horizontal and vertical second order current pixel based gradient values are determined as shown with respect to Equations (9):

Diff2[0]=Min(abs($H\_D$[4]−$H\_D$[0]),abs($H\_D$[4]−$H\_D$[1]),abs($H\_D$[4]−$H\_D$[2]),abs($H\_D$[4]−$H\_D$[3]),abs($H\_D$[5]−$H\_D$[0]),abs($H\_D$[5]−$H\_D$[1]),abs($H\_D$[5]−$H\_D$[2]),abs($H\_D$[5]−$H\_D$[3]),abs($H\_D$[4]−$H\_D$[5]))

Diff2[1]=Min(abs($V\_D$[4]−$V\_D$[0]),abs($V\_D$[4]−$V\_D$[1]),abs($V\_D$[4]−$V\_D$[2]),abs($V\_D$[4]−$V\_D$[3]),abs($V\_D$[5]−$V\_D$[0]),abs($V\_D$[5]−$V\_D$[1]),abs($V\_D$[5]−$V\_D$[2]),abs($V\_D$[5]−$V\_D$[3]),abs($V\_D$[4]−$V\_D$[5]))  (9)

where Diff2[0] is the horizontal second order current pixel based gradient value, Diff2[1] is the vertical second order current pixel based gradient value, and H_D and V_D values are gradient values determined as shown in Equations (8) above and Equations (10) as follows:

$H\_D$[4]=$R$31−$R$33

$H\_D$[5]=$R$33−$R$35

$V\_D$[4]=$R$13−$R$33

$V\_D$[5]=$R$33−$R$53  (10)

where H_D are horizontal gradient values and V_D are vertical gradient values.

As shown, the horizontal second order current pixel based gradient value for a current pixel is determined based on minimums of differences (e.g., H_D[4]−H_D[0], H_D[4]−H_D[1], and so on) between differences between pixels within neighborhood 300 (e.g., H_D [4]=R31−R33, H_D [0]=R11−R13, H_D [1]=R13−R15, and so on) inclusive of the current pixel (e.g., such that pixel 302 is used in the determination) and using pixels of the same color as the current pixel. Similarly, the vertical second order current pixel based gradient value for a current pixel is determined based on minimums of differences (e.g., V_D[4]−V_D[0], V_D[4]−V_D[1], and so on) between differences between pixels within neighborhood 300 (e.g., V_D [4]=R13−R33, V_D [0]=R11−R31, V_D [1]=R31−R51, and so on) inclusive of the current pixel (e.g., such that pixel 302 is used in the determination) and using pixels of the same color as the current pixel.

Processing continues at decision operation 503, where a determination is made as to whether detection criteria for a hot pixel are met. If not, processing continues at operation 504, where the pixel is deemed not a hot pixel and another current pixel is selected for processing as discussed, beginning with operation 501 (e.g., the pixel is not modified and processing moves to a next pixel). If so, processing continues at operation 505 as discussed further below.

In some embodiments, the detection criteria for a hot pixel are provide as shown in Pseudocode (11) as follows:

(i) When Diff2[0] < Diff2[1] and Diff_H2 == 0, if(max(R33, Max(R11,R13,R15,R31,R35,R51,R53,R55)) * 0.75<Diff2[0]) then Hot_Pixel=true  (11)
(ii) When Diff2[0]>Diff2[1] and Diff_H2 != 0, if(5*Diff_H2<Diff2[0] && max(R33, Max(R11,R13,R15,R31,R35,R51,R53,R55))<Diff2[0]*TH_Diff2_Max) then Hot_Pixel = true
(iii) If Diff2[1] < Diff2[0], change Diff_H2 to Diff_V2 and Diff2[0] to Diff2[1]

where Hot_Pixel is the determination as to whether detection criteria for a hot pixel are met.

As shown with respect to (i), in some embodiments, when the horizontal second order current pixel based gradient value is less than the vertical second order current pixel based gradient value and the horizontal second order gradient is zero, if the max of the current pixel value and the max of all other pixel values of the same color in the neighborhood multiplied by a factor (e.g., a predetermined factor of 0.75 in this example) is less than the horizontal second order current pixel based gradient value, the detection criteria for a hot pixel is met. In some embodiments, as shown with respect to (ii), when the horizontal second order current pixel based gradient value is greater than the vertical second order current pixel based gradient value and the horizontal second order gradient is non-zero, if a factor multiplied by the horizontal second order gradient is less than the horizontal second order current pixel based gradient value and the max of the current pixel value and the max of all other pixel values of the same color in the neighborhood is less than the horizontal second order current pixel based gradient value multiplied by a predetermined factor (e.g., TH_Diff2 Max), the detection criteria for a hot pixel is met.

As noted in Equations (11), part (iii), the above horizontal and vertical gradient values may be swapped in the above implementation (e.g., in addition to the discussion above) to determine whether the detection criteria for a hot pixel is met.

As shown, when any of the hot pixel detection criteria are met, processing continues at operation 505 where global check conditions are checked. For example, operations 501-503 may provide hot pixel detection while operation 505 provides a sanity check or global check as to whether hot pixel correction is beneficial. As shown, if the global check conditions are met, hot pixel correction is performed at operation 506, as discussed below. If not, processing continue at operation 504, where the pixel is deemed not a hot pixel. In either case, processing continues with another pixel being selected for processing and the discussed operation being repeated for each pixel of the input image until processing is complete for all pixels.

In some embodiments, evaluating the global check conditions includes determining three averages: a first layer average, a second layer average, and a neighbor average. In an embodiment, the first layer average is an average of neighbor pixels of any color immediately neighboring the current pixel. With reference to FIG. 4, in an embodiment, the first layer average is an average of pixels 401. In an embodiment, the second layer average is an average of all secondary neighbor pixels (e.g., of any color) that are secondary neighbors of the current pixel. With reference to FIG. 4, in an embodiment, the second layer average is an average of pixels 402. In an embodiment, the neighbor average is an average of secondary neighbor pixels having the same color as the current pixel. The neighbor average may also be characterized as secondary layer same color average. With reference to FIG. 4, in an embodiment, the neighbor average is an average of pixels 401 having the same color as current pixel 302 (e.g., R11, R13, R15, R31, R35, R51, R53, R55).

As discussed, the first step for the sanity or global hot pixel check is to determine three averages: first layer average, second layer average, and neighbor average. The first layer average is an average for pixel intensity in the first layer, the second layer is pixel intensity average for the second layer pixel, and the neighbor pixel average is an average with the same color pixel in the second layer.

Next, a threshold set is determined based on the first layer average and the second layer average. In an embodiment, there are two different threshold sets. In an embodiment, a threshold set is selected based on whether min(first layer average, second layer average)<30 (e.g., a threshold) or not. For example, if the min is less than the threshold, a first threshold set is set and if the min not less than the threshold, a second threshold set is used.

Then, the neighbor average compared to the current pixel and a condition is applied based on the comparison. In an embodiment, if the neighbor average multiplied by a factor is larger than the current pixel value, the condition as shown in Pseudocode (12) is applied:

$$\text{If (Nei\_avg*TH\_Nei\_Org} > \text{R33 and First\_Layer*TH\_FL} > \text{Second\_Layer*TH\_SL) then current pixel is a hot pixel} \quad (12)$$

where Nei_avg is the neighbor average, TH_Nei_Org is a threshold determined based on the threshold set, R33 is the current pixel value, First_Layer is the first layer average, TH_FL is a threshold determined based on the threshold set, Second_Layer is the second layer average, and TH_SL is a threshold determined based on the threshold set. As shown, if the conditions are satisfied, the current pixel is deemed to be a hot pixel and if not, the current pixel is not deemed to a hot pixel.

In an embodiment, if the neighbor average multiplied by the factor is less than the current pixel value, the condition as shown in Pseudocode (13) is applied:

$$\text{If (If Nei\_Vag*TH\_Nei\_Org} < \text{R33 and First\_Layer*TH\_FL} < \text{Second\_Layer*TH\_SL) then current pixel is a hot pixel} \quad (13)$$

where Nei_avg is the neighbor average, TH_Nei_Org is a threshold determined based on the threshold set, R33 is the current pixel value, First_Layer is the first layer average, TH_FL is a threshold determined based on the threshold set, Second_Layer is the second layer average, and TH_SL is a threshold determined based on the threshold set. As shown, if the conditions are satisfied, the current pixel is deemed to be a hot pixel and if not, the current pixel is not deemed to a hot pixel. In some embodiments, each of TH_Nei_Org, TH_FL, and TH_SL when min(first layer average, second layer average)<30 are less than each of TH_Nei_Org, TH_FL, and TH_SL when min(first layer average, second layer average)>30.

As shown, if the pixel is deemed to be a hot pixel, processing continues at operation 506, where the hot pixel is corrected. The hot pixel may be corrected using any suitable technique or techniques. In some embodiments, the current pixel is corrected to a corrected current pixel in response to the current pixel being detected as a hot pixel such that the corrected current pixel is based on neighbor pixels of the current pixel of the same color. In an embodiment, the corrected current pixel is an average of at least some of the red (e.g., same color) neighbor pixels. In an embodiment, the corrected current pixel is determined as discussed with respect to Equation (6). In an embodiment, hot and warm pixel correction are performed using the same technique.

Returning to FIG. 1, processing may continue at operation 103 after the correction of such warm and/or hot pixels. As shown, at operation 103, the green channel of the color filter array image is restored. The green color channel may be restored using any suitable technique or techniques such as interpolation techniques. In some embodiments, restoration of the green color channel is independent of the horizontal, vertical, and blend operations discussed further herein, which may be applied only to the blue and red color channels. In some embodiments, restoration of the green color channel also implements such horizontal, vertical, and blend decision and restoration operations.

Figure 6:
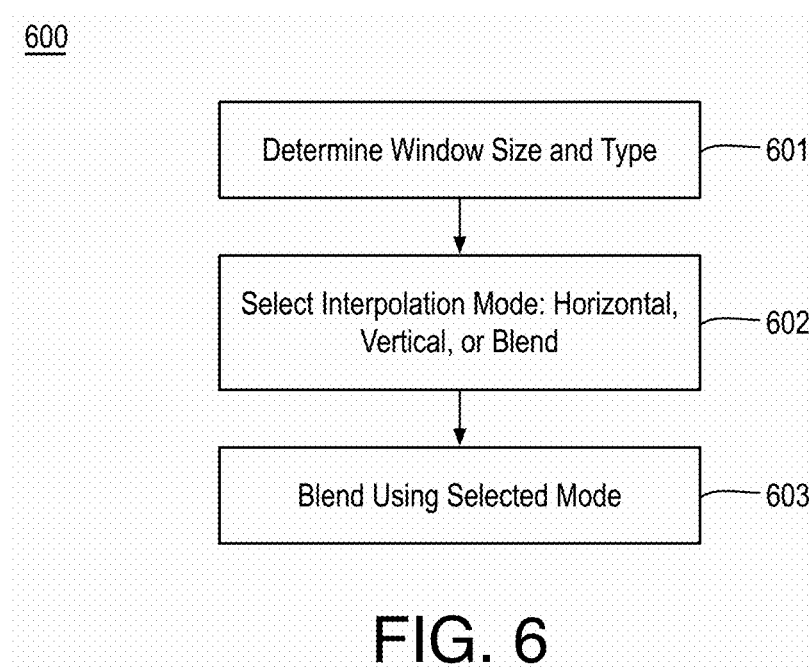
FIG. 6 illustrates an example process for performing horizontal, vertical, or blend interpolation.

Processing continues at operation 104, where horizontal and vertical interpolation decision and blend operations are performed to restore the red and blue color channels or to generate candidates for the restoration of such color channels. In some embodiments, the FIG. 6 illustrates an example process 600 for performing horizontal, vertical, or blend interpolation, arranged in accordance with at least some implementations of the present disclosure. Process 600 may include one or more operations 601-603 as illustrated in FIG. 6. Process 600 or portions thereof may be performed by a device to perform horizontal, vertical, or blend interpolation for demosaicing. Process 600 or portions thereof may be repeated for any number of pixels of an input image such as a color filter array image.

Process 600 begins at operation 601, where, for a current pixel, a window size and type are determined. In some embodiments, three types of windows (or neighborhood, such terms are used interchangeably herein) may be used for horizontal, vertical, or blend decision and interpolation such that the three types of windows provide for the horizontal and vertical differences used for the current pixel, as discussed further herein below. In an embodiment, the first window is a 7×7 window (e.g., a 7 by 7 pixel window centered at the current pixel) that uses the same color difference between the same color pixels. In an embodiment, the second window is a 5×5_1 window (e.g., a 5 by 5 pixel window centered at the current pixel having a first difference type) that uses horizontal and vertical differences between different color neighbor pixels. In an embodiment, the third window is a 5×5_2 window (e.g., a 5 by 5 pixel window centered at the current pixel having a second difference type) that uses differences between same color and between different color neighbor pixels.

In an embodiment, two conditions are first applied to determine whether the 7×7 window is to be used. If both are true, the 7×7 window is applied or if one or both are not true, the 7×7× window is not used. In an embodiment, the first condition is provided by Pseudocode (14):

$$(Avg\_BNE < 5 \ \&\& \ Sum\_Min\_Max == 0 \ \&\& \ m\_bColor == true) \quad (14)$$

where Avg_BNE is the average block noise estimation, Sum_Min_Max is the sum of minimum and maximum values for a first number of BNE blocks (e.g., 5 BNE blocks), and m_bColor provides a flag to indicate whether the input image is a non-noisy image. As shown, if the average block noise estimation is less than a threshold, the sum of minimum and maximum values for a first number of BNE blocks is zero, and the image is non-noisy, the first condition is met. Although illustrated with respect to Avg_BNE and Sum_Min_Max, any noise value for the input image may be used.

In an embodiment, the second condition is provided by Pseudocode (15):

$$\begin{aligned}&Min\_Loc[x] == 8 \ \&\& \ 3*abs(Max\_Value5\times5-Min\_Value5\times5) < (Max\_Value5\times5 + \\ &Min\_Value5\times5) \ \&\& \ 5 * abs(Max\_Value-Min\_Value) > (Max\_Value + Min\_Value) \ \&\& \\ &\qquad Diff\_Color\_Diff > 5 \\ &\qquad \text{where:} \end{aligned} \quad (15)$$

Max_Value5×5 (Min_Value5×5): Max (min) value for the same color in 5×5 block Max_Value (Min_Value): If the current pixel is either R or B, then Max(R33,B44) (Min(R33,B44) used and
   If the current pixel is G33, then Max(R34,B43) (Min(R34,B34)) used
      Diff_Color_Diff = min(Diff_Color_Diff_V, Diff_Color_Diff_H)
Diff_Color_Diff_H = max(abs(R33−G32)+abs(R33−G34), abs(G43−B42)+abs(G43−B44))
Diff_Color_Diff_V = max(abs(R33−R23)+abs(R33−R43), abs(R34−R24)+abs(R34−R44))

As discussed, if the first and second conditions are met, a 7×7 window that uses the same color difference between the same color pixels is to be applied. If not, one of 5×5_1 or 5×5_2 are to be applied. For 5×5_1 and 5×5_2, pixels are normalized with avg_r, avg_gr, avg_gb, and avg_b. If a 7×7 window is not selected for the current pixel, either 5×5_1 or 5×5_2 are selected for the pixel. In some embodiments, there are two conditions to determine between 5×5_1 and 5×5_2. In an embodiment, the first condition uses mean_horz which is average of horizontal difference (e.g., average (abs(G23−B22), abs(B24−G23), abs(R33−G23), abs(G34−R33), abs (G43−B42), abs(B44−G43) and mean_vert which is average of vertical difference within a 3×3 window around the current pixel (e.g., similar to the horizontal difference in the vertical direction. With mean_horz and mean_vert, Pseudocode (16) is applied:

$$\begin{aligned}&turnonhorz = (mean\_horz<(mean\_vert*m\_tolerance\_color)) \\ &turnonvert = (mean\_vert<(mean\_horz*m\_tolerance\_color)) \\ &\quad if \ (turnonhorz == 0 \ \&\& \ turnonvert == 0) \\ &\qquad turnonhorz = 1 \ and \ turnonvert = 1; \end{aligned} \quad (16)$$

where turnonhorz is a flag to indicate horizontal interpolation is enabled, turnonvert is a flag to indicate vertical interpolation is enabled, and m tolerance color is a predetermined factor. If turnonhorz (turnonvert) is set to 1, 5×5_2 is used. Otherwise, 5×5_1, which uses only different color differences, is selected.

In some embodiments, the second condition uses two different averages. In an embodiment, the first average is an average with the same color differences. In an embodiment, the first average is an average of the 8 differences between R33 and each of R11, R13, R15, R31, R35, R51, R53, and R55. In an embodiment, the second average is an average of differences between the current pixel (R33) and different color pixels (G23, G32, F34, and G43). In some embodiments, if the same color difference average (e.g., the first average) times 3 is smaller than the average of different color differences (e.g., the second average), turnonhorz and turnonvert are set to 1. In an embodiment, if turnonhorz (turnonzert) is 1, 5×5_2 is used. Otherwise, 5×5_1, which uses only different color differences, is selected.

Processing continues at operation 602, where an interpolation mode from horizontal, vertical, or blend is selected for the current pixel. In some embodiments, selecting the mode includes receiving a color filter array image such that the color filter array image includes a current pixel (e.g., pixel 302) of a first color (e.g., red) at a center of a pixel window around the current pixel such that the pixel window includes pixels (e.g., pixels 301. In an embodiment, the pixel window side (and pixels used for selecting the mode) is determined as discussed above.

In some embodiments, selecting the interpolation mode includes generating a vertical differences value for the pixel window and a horizontal differences value for the pixel window. The horizontal differences value is, in turn, based on a left side horizontal differences value generated using pixels aligned with and to the left of the current pixel in the pixel window and a right side horizontal differences generated value using pixels aligned with and to the right of the current pixel in the pixel window. Similarly, the vertical differences value is based a top side vertical differences values generated using pixels aligned with and above the current pixel in the pixel window and a bottom side vertical differences value generated using.

In an embodiment, the vertical and horizontal differences values are generated as shown in Equations (17) as follows:

VCD_Vert=min(VCD_Vert_top,VCD_Vert_bottom)+
(max(VCD_Vert_top,VCD_Vert_bottom)−min
(VCD_Vert_top,VCD_Vert_bottom))*0.5

VCD_Horz=min(VCD_Horz_left,VCD_Horz_right)+
(max(VCD_Horz_left,VCD_Horz_right)−min
(VCD_Horz_left,VCD_Horz_right))*0.5     (17)

where VCD_Vert is the vertical differences value for the pixel window, VCD_Horz is the horizontal differences value for the pixel window, 0.5 is a predefined factor or weight.

VCD_Vert_top is the top side vertical differences value for the pixel window, VCD_Vert_bottom is the bottom side vertical differences value for the pixel window, VCD_Horz_left is the left side horizontal differences value for the pixel window, and VCD_Horz_right is the right side horizontal differences value for the pixel window. The top, bottom, left, and right side differences values are generated by analyzing differences in the pertinent direction (e.g., horizontal or vertical) for those pixels in line with the current pixel and included in pertinent side of the pixel window.

For example, with reference to FIG. 3, a top side vertical differences value determines differences between pixels in a top 311 of pixel window or neighborhood 301 such that the pixels in top 311 include those pixels in the same row as current pixel 302 and those pixels in rows above current pixel 302 and within pixel window or neighborhood 301. Pixels of bottom 312, left 313, and right 314 of pixel window or neighborhood 301 may be similarly defined (using columns in place of rows for left 313 and right 314). For example, VCD_Vert_top may be a sum of absolute difference for top 311 in pixel window or neighborhood 301, VCD_Vert_bottom may be a sum of absolute difference for bottom 311 in pixel window or neighborhood 301, VCD_Horz_left may be a sum of absolute difference for left 313 in pixel window or neighborhood 301, and VCD_Horz_right may be a sum of absolute difference for right 314 in pixel window or neighborhood 301.

As discussed, the pixel window may be 5×5 or 7×7 and the top, bottom, left, and right side differences values may be generated based on any color values or only based on those color values that are the same as current pixel 302 (e.g., only red values in this example). In some embodiments, the top, bottom, left, and right side differences values are generated as shown with respect to Equations (18) as follows, which illustrates the 5×5_1 pixel window example (e.g., a 5×5 window where differences between different color neighbor pixels are used):

VCD_Ver_top=abs($R11-G21$)+abs($G21-R31$)+abs
($G12-B22$)+abs($B22-G32$)+abs($R13-G23$)+abs
($G23-R33$)+abs($G14-B24$)+abs($B24-G34$)+abs
($R15-G25$)+abs($G25-R35$)

VCD_Ver_bottom=abs($R31-G41$)+abs($G41-R51$)+
abs($G32-B42$)+abs($B42-532$)+abs($R33-G43$)+
abs($G43-R53$)+abs($G34-B44$)+abs($B44-G54$)+
abs($R35-G45$)+abs($G45-R55$)

VCD_Hor_left=abs($R11-G12$)+abs($G12-R13$)+abs
($G21-B22$)+abs($B22-G23$)+abs($R31-G32$)+abs
($G32-R33$)+abs($G41-B42$)+abs($B42-G43$)+abs
($R51-G52$)+abs($G52-R53$)

VCD_Hor_right=abs($R13-G14$)+abs($G14-R15$)+abs
($G23-B24$)+abs($B24-G25$)+abs($R33-G34$)+abs
($G34-R35$)+abs($G42-B44$)+abs($B44-G45$)+abs
($R53-G54$)+abs($G54-R55$)     (18)

where VCD_Ver_top is the top side vertical differences value, VCD_Ver_bottom is the bottom side vertical differences value, VCD_Hor_left is the left side horizontal differences value, and VCD_Hor_right is the right side horizontal differences value. Such calculations may be extended to 7×7 and only using the same color as the current pixel.

Using the discussed vertical and horizontal differences values, as well as previously discussed input image noise values, one of the three modes (horizontal, vertical, or blend) is selected. In an embodiment, the horizontal interpolation mode is selected in response to the horizontal differences value being less than the vertical differences value times a threshold that is less than one, the vertical interpolation mode is selected in response to the vertical differences value being less than the horizontal differences value times the threshold, or the blend interpolation mode is selected otherwise. In some embodiments, the horizontal interpolation mode is selected in response to the horizontal differences value being less than the vertical differences value and each pixel within a 3×3 window of the current pixel having a greater vertical differences value than horizontal differences value and the color filter array image being a low or medium noise image. As used herein, the term low noise indicates an image having noise metric that is less than a first threshold, medium noise indicates an image having noise less than a second threshold that is greater than the first threshold, and high noise indicates an image having noise greater than the second threshold. In an embodiment, the noise metric is average BNE as discussed herein although any metric such as pixel variance may be used.

In an embodiment, the interpolation mode is selected as shown in Pseudocode (19) as follows:

if ((VCD_Horz < VCD_Vert*m_tolerance_var) || ((VCD_Horz<VCD_Vert && Same_Dir_H ==    (19)

8) && ( Avg_BNE<Medium_Noise_TH || Sum_BNE == 0 and Sum_Min_Max == 0))

m_Green8->m_G[y][x] = Hor_Dir;

else if ((VCD_Vert < VCD_Horz*m_tolerance_var) || ((VCD_Vert<VCD_Horz &&

Same_Dir_V == 8) && ( Avg_BNE<Midium_Noise_TH || Sum_BNE == 0 and Sum_Min_Max

== 0))

m_Green8->m_G[y][x] = Ver_Dir;

else m_Green8->m_G[y][x] = Blend_Dir;

where m_tolerance_var is a color tolerance factor that is less than one (examples are provided below), Medium_Noise_TH is a noise threshold, Same_Dir_H and Same_Dir_V are counter variables as discussed below, and m_Green8 is a variable that stores the interpolation mode for the current pixel.

As shown in Pseudocode (19), if the horizontal differences value is less than the vertical differences value times the color tolerance factor, the horizontal interpolation mode is selected. Similarly, if the vertical differences value is less than the horizontal differences value times the color tolerance factor, the vertical interpolation mode is selected. Furthermore, if the horizontal differences value is less than the vertical differences value and Same_Dir_H is 8 and the noise for the input image is medium or low (e.g., Avg_BNE<Medium Noise_TH||Sum_BNE=0 and Sum_Min_Max=0), the horizontal interpolation mode is selected. Similarly, if the vertical differences value is less than the horizontal differences value and Same_Dir_V is 8 and the noise for the input image is medium or low (e.g., Avg_BNE<Midium_Noise_TH||Sum_BNE=0 and Sum_Min_Max=0), the vertical interpolation mode is selected.

Same_Dir_H is a counter variable that is a counter and this is increased by 1 when VCD_Horz<VCD_Vert for a pixel within a 3 by 3 pixel window of the current pixel. Therefore, the condition Same_Dir_H is 8 indicates each pixel within a 3×3 window of the current pixel (e.g., inclusive of the current pixel, which has already been tested) has a greater vertical differences value than horizontal differences value. Similarly, the condition Same_Dir_V is 8 indicates each pixel within a 3×3 window of the current pixel (e.g., inclusive of the current pixel) has a greater horizontal differences value than vertical differences value.

Therefore, the horizontal interpolation mode may be selected in response to the horizontal differences value for the current pixel being less than the vertical differences value for the current pixel and each pixel within a 3×3 window of the current pixel having a greater vertical differences value than horizontal differences value and the color filter array image being a low or medium noise image. Similarly, the vertical interpolation mode may be selected in response to the vertical differences value for the current pixel being less than the horizontal differences value for the current pixel and each pixel within a 3×3 window of the current pixel having a greater horizontal differences value than vertical differences value and the color filter array image being a low or medium noise image.

As discussed, a color tolerance factor (m_tolerance_var) is provided in Pseudocode (19). The color tolerance factor may be any suitable value that is less than one. In an embodiment, the color tolerance factor is not more than 0.5. In an embodiment, the color tolerance factor is dependent on image noise in the input color filter array image such that the color tolerance factor is a higher value for lower noise input images. In an embodiment, the color tolerance factor is a first value for a low noise input image, a second value for a medium noise input image, and a third value for a high noise input image where the first value is greater than the second value which is, in turn, greater than the third value. In some embodiments, the color tolerance factor (m_tolerance_var) is provided as shown in Pseudocode (20):

$$\begin{aligned}&\text{m\_Tolerance\_Var} = 0.5 \text{ if Avg\_BNE} <\text{Medium\_Noise\_TH},\\&\text{m\_Tolerance\_Var} = 0.25 \text{ if Avg\_BNE} <\text{High\_Noise\_TH},\\&\text{m\_Tolerance\_Var} = 0.125 \text{ else}\end{aligned} \quad (20)$$

where m_tolerance_var is the color tolerance factor that is set dependent on input image noise, Medium_Noise_TH is a medium noise threshold (differentiating between input images of low and medium noise) and High_Noise_TH is a high noise threshold (differentiating between input images of medium and high noise). As shown, in some embodiments, the color tolerance factor is set to 0.5 in response to the input image being a low noise image, to 0.25 in response to the input image being a medium noise image, and to 0.125 in response to the input image being a high noise image.

As shown, processing continues at operation 603, where color values for the pixel other than the off the sensor color value are interpolated using the interpolation mode selected at operation 602. The horizontal, vertical, and blend interpolations may be performed using any suitable technique or techniques. In an embodiment, the horizontal interpolation interpolates the color value for the current pixel using only horizontally aligned pixel values. Similarly, the vertical interpolation may interpolate the color value for the current pixel using only vertically aligned pixel values. In an embodiment, the blend interpolation provides a pixel value as follows in Equation (21):

$$\begin{aligned}\text{Blend\_Dir}=&(\text{Hor\_Interpolation}(x,y)*(\text{Ver\_Dist})+\\&\text{Vert\_interpolation}(x,y)*(\text{Hor\_Dist}))/(\text{Ver\_dist}+\\&\text{Hor\_Dist})\end{aligned} \quad (21)$$

where Blend_Dir is the blended value for the pixel, Hor_Interpolation is the horizontal interpolation value for the pixel, Vert_Interpolation is the vertical interpolation value for the pixel, Ver_Dist is vertical distortion, and Hor_Dist is horizontal distortion. The vertical and horizontal distortion may be generated using any suitable technique or techniques such as those discussed herein with respect to VCD_Vert and VCD_Horz.

As shown in Equation (21), bilinear interpolation based on distortion nay be applied to determine the blended value for the pixel. If Vertical (or horizontal) distortion is smaller than horizontal (or vertical) distortion, a ratio of vertical (or horizontal) interpolation value is larger than horizontal (or vertical) interpolation value. So, the final value is closer to the vertical (or horizontal) interpolation value rather than horizontal (or vertical) interpolation value.

With reference to FIG. 1, operation 603 may be implemented at operation 103 and/or operation 106 to generate R, G, B color channels for each pixel of the input color filter array image. In some embodiments, operation 105 may be performed before operation 106 as shown. In other embodiments, operation 105 is performed after operation 106 but operation 105 is still performed using only sensor data. As shown, in some embodiments, angle detection is performed (at operation 105), followed by restoration of red and blue channels, which is then followed by angle compensation (e.g., filtering) of the full color image.

Returning to FIG. 1, processing continues at operation 105, where angle detection is performed for pixels of the input image. Notably, the discussed horizontal, vertical, and blend decision and interpolation includes three directions (e.g., horizontal interpolation at 0°, vertical at 90°, and a blend or weighted average of the horizontal and vertical interpolations). At operations 105, 106, 107, optional angle detection and compensation is performed outside of horizontal, vertical, and blend. In the illustrated embodiment, such angle detection and compensation is performed on the red and blue channels. However, the angle detection and compensation may also be performed for green channels.

The discussed combination of horizontal, vertical, and blend decision and interpolation may offer sufficient quality for demosaicing most regions of the input image (e.g., RAW input content). However, regions of strong angled input content such those in areas of angled edges and significant luminance/chrominance transition in an angled direction may include undesirable jagged artifacts along edges when only horizontal, vertical, and blend decision and interpolation are applied.

In some embodiments, angle correction includes a two-step technique—angle detection followed by angle compensation. The following discussion focuses on angle detection while angle compensation is discussed further herein below.

Figure 7:
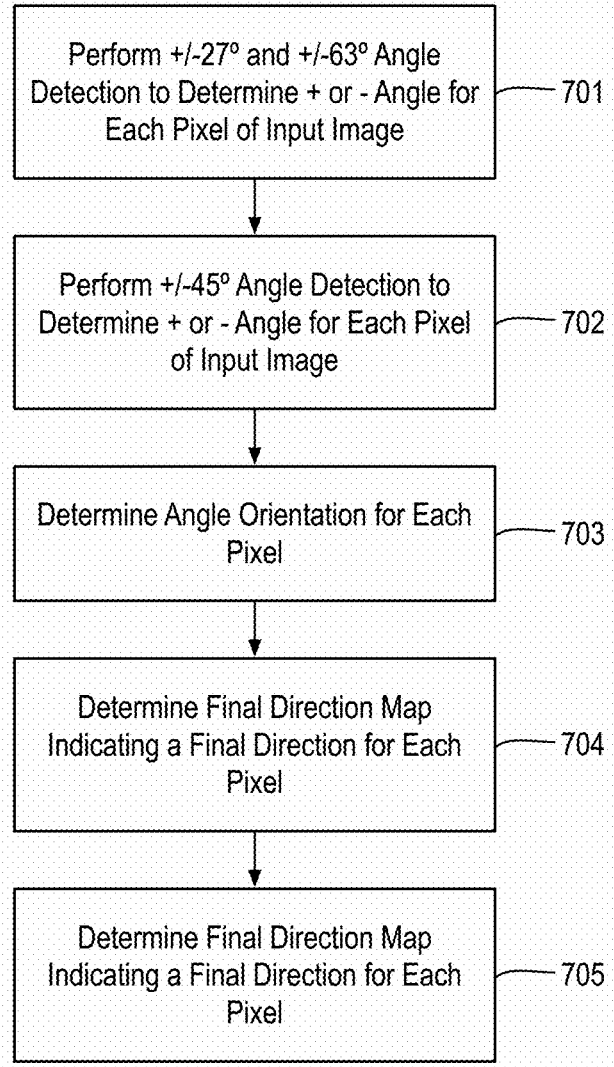
FIG. 7 illustrates an example process for angle detection and correction.

FIG. 7 illustrates an example process 700 for angle detection and correction, arranged in accordance with at least some implementations of the present disclosure. Process 700 may include one or more operations 701-705 as illustrated in FIG. 7. Process 700 or portions thereof may be performed by a device to perform angle detection and correction for demosaicing. Process 700 or portions thereof may be repeated for any number of pixels of an input image such as a color filter array image. In some embodiments, operations 701-704 are performed at operation 105 of process 100 and operation 705 is performed at operation 107 of process 100.

Notably, the following discussion focuses on six angles (e.g., acute angles) to resolve to high quality full color image results, after extensive testing of a variety of available angles. Such angles include +/−45° (i.e., +45° being 45° rotated vertically from a right extending horizontal line and −45° being 45° rotated vertically from a left extending horizontal line), +27° (i.e., +27° being 27° rotated vertically from a right extending horizontal line and −27° being 27° rotated vertically from a left extending horizontal line), and +/−63° (i.e., +63° being 63° rotated vertically from a right extending horizontal line and −63° being 63° rotated vertically from a left extending horizontal line).

Figure 8:
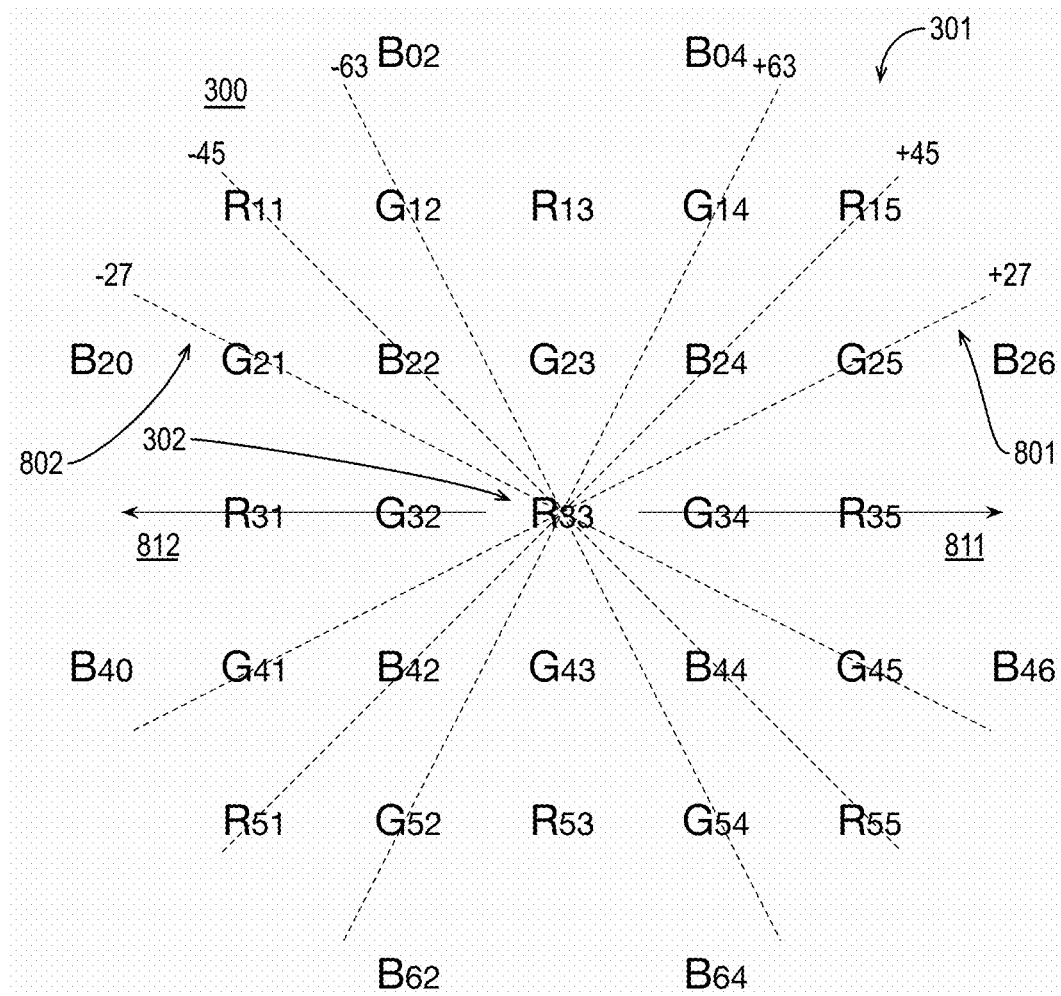
FIG. 8 illustrates example image neighborhood and exemplary angles for detection and correction.

FIG. 8 illustrates example image neighborhood 300 and exemplary angles for detection and correction, arranged in accordance with at least some implementations of the present disclosure. As shown in FIG. 8, relative to pixel 302 (e.g., a current or target pixel), three positive angles 801 and three negative angles 802 are evaluated for detection and correction as discussed herein. As shown, positive angles 801 include +27°, which is 27° rotated vertically about pixel 302 from a right extending horizontal line 811, +45°, which is 45° rotated vertically about pixel 302 from right extending horizontal line 811, and +63°, which is 63° rotated vertically about pixel 302 from right extending horizontal line 811. Similarly, negative angles 802 include −27°, which is 27° rotated vertically about pixel 302 from a left extending horizontal line 812, −45°, which is 45° rotated vertically about pixel 302 from left extending horizontal line 812, and −63°, which is 63° rotated vertically about pixel 302 from left extending horizontal line 812. For example, right extending horizontal line 811 is in a first direction and left extending horizontal line 812 is a second direction opposite the first direction, both along a horizontal of the input image. It is noted that FIG. 8 also includes additional pixels needed for the following processing. In particular, B02, B04, B26, B46, B64, B62, and B20.

Returning to FIG. 7, processing begins at operation 701, where +/−27° and +/−63° angle detection is performed to determine whether a current pixel has a positive or negative angle corresponding thereto. Such angle detections may be performed for any color pixel of a color filter array input image. Notably, in the following discussion, details are provided for red and green pixels while similar procedures may be followed for blue pixels, which may be derived from the discussion of the red pixels by replacing red pixel notations with blue pixel notations since the relative patterns of red and blue pixels match. As used herein, the term substantially aligned with respect to an angle (or a line as defined by the angle) indicates the alignment is both not more than 40° out of alignment and within the same quadrant as defined the horizontal and vertical lines bounding the angle. For example, +63°, +45°, and +27° are substantially aligned with one another but no angle of <=0° or >=90° may be substantially aligned with any of them.

With reference to FIG. 8, which illustrates a red center pixel, R33, green content is not aligned with +/−27° or +/−63° within the first layer of neighboring pixels from center pixel R33. That is, no green pixel of pixels 401 (please refer to FIG. 4) lies along +/−27° or +/−63° lines. To perform angle detection, intermediate green pixel values within the first layer are interpolated as shown in Equations (22) as follows:

$$G33\_N27=(2*(G32+G21)+2*(G34+G45)+2*R33-R31-R35)>>3;$$

$$G33\_P27=(2*(G32+G41)+2*(G34+G25)+2*R33-R31-R35)>>3;$$

$$G33\_N63=(2*(G23+G12)+2*(G43+G54)+2*R33-R13-R53)>>3;$$

$$G33\_P63=(2*(G23+G14)+2*(G43+G52)+2*R33-R13-R53)>>3; \qquad (22)$$

where G33_N27 is an interpolated intermediate green value for the −27° angle, G33_P27 is an interpolated intermediate green value for the +27° angle, G33_N63 is an interpolated intermediate green value for the −63° angle, and G33_P63 is an interpolated intermediate green value for the +63° angle.

As shown in Equations (22), the interpolated intermediate green value for the +27° angle is a sum of twice a sum of the green pixel values that straddle the +27° angle line in a first direction (e.g., left) from the current pixel (i.e., 2*(G32+G21)), twice a sum of the green pixel values that straddle the +27° angle line in a second direction opposite the first direction (e.g., right) from the current pixel (i.e., 2*(G34+G45)), twice the current pixel (i.e., 2*R33), the negative of the red pixel in line with the first direction (i.e., −R31), and the negative of the red pixel in line with the second direction (i.e., −R35). The remaining interpolated intermediate green values are determined in a similar manner as shown in Equations (21).

Based on the interpolated green values, gradients or distortions along +/−27° or +/−63° are generated. In an embodiment, the gradients are generated as show in Equations (23):

$$GP27=abs(G41-G33\_P27)+abs(G33\_P27-G25);$$

$$GN27=abs(G21-G33\_N27)+abs(G33\_N27-G45);$$

$$BP27=abs(B24-B40)+abs(B42-B26);$$

$$BN27=abs(B22-B46)+abs(B44-B20);$$

$$GP63 = \text{abs}(G52-G33\_P63) + \text{abs}(G33\_P63-G14);$$

$$GN63 = \text{abs}(G12-G33\_N63) + \text{abs}(G33\_N63-G54);$$

$$BP63 = \text{abs}(B42-B04) + \text{abs}(B24-B62);$$

$$BN63 = \text{abs}(B02-B44) + \text{abs}(B22-B64); \qquad (23)$$

where GP27 is the green distortion value for the +27° angle, GN27 is the green distortion value for the −27° angle, BP27 is the blue distortion value for the +27° angle, BN27 is the blue distortion value for the −27° angle, GP63 is the green distortion value for the +63° angle, GN63 is the green distortion value for the −63° angle, BP63 is the blue distortion value for the +63° angle, and BN63 is the blue distortion value for the −63° angle.

As shown, the green distortion value for the +27° angle is a sum of (i) an absolute value difference between a second layer green pixel along +27° angle in a direction from the current pixel and the interpolated first layer intermediate green value for the +27° angle in an opposite direction (i.e., abs(G41−G33_P27)) and (ii) an absolute value difference between the interpolated first layer intermediate green value for the +27° angle in the opposite direction and a second layer green pixel along +27° angle in the opposite direction (i.e., abs(G33_P27−G25)). The remaining green distortion values are determined in a similar manner as shown in Equations (23).

Furthermore, the blue gradient value for the +27° angle is a sum of (i) an absolute value difference between a first layer blue pixel above the +27° angle line in a direction from the current pixel and a third layer (e.g., tertiary layer) blue pixel from above the +27° angle line in an opposite direction from the current pixel (i.e., abs(B24−B40)) and (ii) an absolute value difference between a first layer blue pixel below the +27° angle line in the opposite direction from the current pixel and a third layer blue pixel from below the +27° angle line in the (original) direction from the current pixel. The remaining blue gradient values are determined in a similar manner as shown in Equations (22). It is noted that both the green gradient value and the blue gradient values are for gradients that are not the color of the current pixel (i.e., red).

In some embodiments, a detected positive or negative angle for the pixel (if any) is determined based on the +/−27° or +/−63° characteristics as shown in Pseudocode (24):

```
(DirMapScaleTaper*GP27 <= GN27 && DirMapScaleTaper*BP27 <= BN27) ||   (24)
   (DirMapScaleTaper*GP63 <= G63 && DirMapScaleTaper*BP63 <= BN63)
              DirMap[y][x] = POS_ANGLED;
else (DirMapScaleTaper*GN27 <= GP27 && DirMapScaleTaper*BN27 <= BP27) ||
   (DirMapScaleTaper*GN63 <= GP63 && DirMapScaleTaper*BN63 <= BP63)
              DirMap[y][x] = NEG_ANGLED;
       where DirMapScaleTaper is the scaling factor for angles 27 & 63
```

As shown, DirMapScaleTaper is a scaling factor that may be any suitable value. As shown with respect to +27° and +63°, a positive angle detection is flagged for the current pixel when (i) the green distortion value for the +27° angle times the scaling factor is less than or equal to the green distortion value for the −27° angle and the blue distortion value for the +27° angle times the scaling factor is less than or equal to the blue distortion value for the −27° angle or (ii) the green distortion value for the +63° angle times the scaling factor is less than or equal to the green distortion value for the −63° angle and the blue distortion value for the +63° angle times the scaling factor is less than or equal to the blue distortion value for the −63° angle. A similar determination is made for negative angle detection. If neither a positive or negative angle is flagged for the current pixel, and indicator of no angle may be provided.

Furthermore, as shown, for the current pixel, only positive or negative angle is defined with respect to Pseudocode (24). That is, the angle selected for correction is determined as discussed further herein.

Discussion now turns to green pixel operations for +/−27° or +/−63°.

Figure 9:
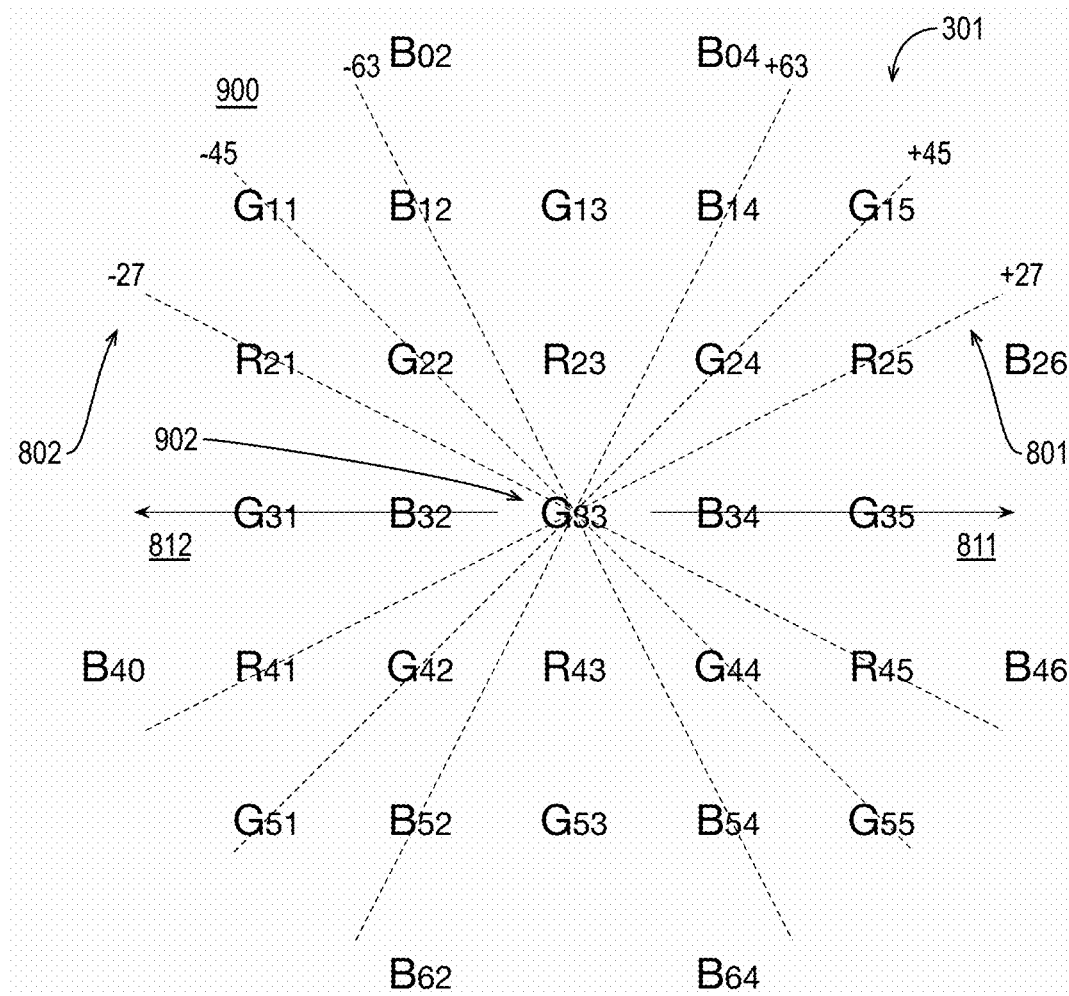
FIG. 9 illustrates an example image neighborhood and exemplary angles for detection and correction centered on a green pixel.

FIG. 9 illustrates an example image neighborhood 900 and exemplary angles for detection and correction centered on a green pixel, arranged in accordance with at least some implementations of the present disclosure. Image neighborhood 900 may have any image neighborhood characteristics discussed herein. As shown in FIG. 9, relative to pixel 902 (e.g., a current or target pixel), three positive angles 801 and three negative angles 802 are evaluated for detection and correction. Such positive angles 801 and negative angles 802 are analogous to those discussed above with respect to FIG. 8.

To perform angle detection for a green pixel centered at 33 (i.e., G33), intermediate green pixel values within the first layer are interpolated as shown in Equations (24) and (25) as follows. Notably, the positions of interest are (2, 3), (4, 3), (3, 2) and (3, 4). For +/−27° angles, the approximations at position (3, 2) and (3, 4) are determined as follows.

$$G32\_N27 = (2*G22+G31)/3;$$

$$G32\_P27 = (2*G42+G31)/3;$$

$$G34\_N27 = (2*G44+G35)/3;$$

$$G34\_P27 = (2*G24+G35)/3; \qquad (25)$$

where G32_N27 is a first interpolated intermediate green value for the −27° angle, G32_P27 is a first interpolated intermediate green value for the +27° angle, G34_N63 is a second interpolated intermediate green value for the −63° angle, and G34_P63 is a second interpolated intermediate green value for the +63° angle.

As shown, the first green gradient value for the −27° angle is a sum of twice a first layer green pixel above the −27° angle line in a direction from the current pixel and a second layer green pixel across the −27° angle line divided by three (e.g., (2*G22+G31)/3). The remaining interpolated intermediate green values are determined in a similar manner as shown in Equations (25).

For +/−63° angles, the approximations at position (2, 3) and (4, 3) are determined as follows.

$$G23\_N63 = (2*G22+G13)/3;$$

$$G23\_P63 = (2*G24+G13)/3;$$

$$G43\_N63 = (2*G44+G53)/3;$$

$$G43\_P63 = (2*G42+G53)/3; \qquad (26)$$

where G23_N63 is a first interpolated intermediate green value for the −63° angle, G23_P63 is a first interpolated intermediate green value for the +63° angle, G43_N63 is a second interpolated intermediate green value for the −63° angle, and G33_P63 is a second interpolated intermediate green value for the +63° angle.

As shown, the first green gradient value for the −63° angle is a sum of twice a first layer green pixel below the −63° angle line in a direction from the current pixel and a second layer green pixel across the −63° angle line divided by three (e.g., (2*G22+G13)/3). The remaining interpolated intermediate green values are determined in a similar manner as shown in Equations (26).

Based on the interpolated green values, gradients or distortions along +/−27° or +/−63° are generated. In an embodiment, the gradients are generated as show in Equations (27):

$$GP27 = abs(G24-G32\_P27) + abs(G42-G34\_P27);$$

$$GN27 = abs(G22-G34\_N27) + abs(G44-G32\_N27);$$

$$GP63 = abs(G42-G23\_P63) + abs(G24-G43\_P63);$$

$$GN63 = abs(G22-G43\_N63) + abs(G44-G23\_N63); \quad (27)$$

where GP27 is the green distortion value for the +27° angle, GN27 is the green distortion value for the −27° angle, GP63 is the green distortion value for the +63° angle, and GN63 is the green distortion value for the −63° angle. Notably, red and blue distortions are not used when the current pixel is a green pixel.

As shown, the green gradient value for the +27° angle is a sum of (i) an absolute value difference between a first layer green pixel above the +27° angle line in a direction from the current pixel and the first interpolated intermediate green value for the −27° angle (i.e., abs(G24−G32_P27)) and (ii) an absolute value difference between a first layer green pixel below the +27° angle line in an opposite direction from the current pixel and the second interpolated intermediate green value for the −27° angle (i.e., abs(G42−G34 P27)). The remaining green distortion values are determined in a similar manner as shown in Equations (27).

In some embodiments, a detected positive or negative angle for the pixel (if any) is determined based on the +/−27° or +/−63° characteristics as shown in Pseudocode (28):

```
(DirMapScaleTaper*GP27 <= GN27 ||              (28)
 DirMapScaleTaper*GP63 <= GN63)
    DirMap[y][x] = POS_ANGLED;
else (DirMapScaleTaper*GN27 <= GP27 ||
      DirMapScaleTaper*GN63 <= GP63)
    DirMap[y][x] = NEG_ANGLED;
```

As discussed, DirMapScaleTaper is a scaling factor that may be any suitable value. As shown with respect to +27° and +63°, a positive angle detection is flagged for the current pixel when (i) the green distortion value for the +27° angle times the scaling factor is less than or equal to the green distortion value for the −27° angle. A similar determination is made for negative angle detection. If neither a positive or negative angle is flagged for the current pixel, and indicator of no angle may be provided.

Returning to FIG. 7, as shown, processing continues at operation 702, where +/−45° angle detection is performed to determine whether the current pixel has a positive or negative angle and/or to cancel the positive or negative angle determination made at operation 701. Such angle detections may be performed for any color pixel of a color filter array input image. Notably, in the following discussion, details are provided for red and green pixels while similar procedures may be followed for blue pixels, which may be derived from the discussion of the red pixels by replacing red pixel notations with blue pixel notations since the relative patterns of red and blue pixels match.

With reference now to FIG. 8, green and blue channels (e.g., pixels) are aligned with +/−45° lines. Therefore, gradients or distortions for current pixel 302 may be generated using pixel data from the sensor and without interpolation. In an embodiment, gradients or distortions along +/−45° are generated. In an embodiment, gradients or distortions are generated as show in Equations (29):

$$GN45 = abs(G32-G43) + abs(G23-G34);$$

$$GP45 = abs(G23-G32) + abs(G34-G43);$$

$$BN45 = abs(B22-B44);$$

$$BP45 = abs(B24-B42); \quad (29)$$

where GN45 is a green distortion value for the −45° angle, GP45 is a green distortion value for the +45° angle, BN45 is a blue distortion value for the −45° angle, and BP45 is a blue distortion value for the +45° angle.

As shown, the green gradient value for the −45° angle is a sum of (i) an absolute value difference between first layer green values along and on a first side of the −45° angle line (i.e., abs(G32−G43)) and (ii) an absolute value difference between second layer green values along and on an opposite side of the −45° angle line (i.e., abs(G23−G34)). The remaining green distortion values are determined in a similar manner as shown in Equations (29).

In some embodiments, the previously detected positive or negative angle for the pixel based on the +/−27° or +/−63° characteristics is checked based on a positive or negative angle for the pixel detected based on the +/−45° characteristics as shown in Pseudocode (30):

```
(DirMapScale_45*GP45 <= GN45 &&                (30)
 DirMapScale_45*BP45 <= BN45)
    (DirMap[y][x] == NEG_ANGLED)
        DirMap[y][x] = NO_DIR;
    else
        DirMap[y][x] = POS_ANGLED;
else (DirMapScale_45*GN45 <= GP45 &&
      DirMapScale_45*BN45 <= BP45)
    (DirMap[y][x] == POS_ANGLED)
        DirMap[y][x] = NO_DIR;
    else
        DirMap[y][x] = NEG_ANGLED;
where DirMapScale_45 is the scaling factor
    for 45 degree angle detection
``` where DirMap[y] [x] is the previous angle flag for the current pixel determined using +/−27° or +/−63° characteristics (e.g., the output of Pseudocode (23)). As discussed, DirMapScale_45 is a 45° scaling factor that may be any suitable value. In some embodiments, DirMapScale_45 is the same as DirMapScaleTaper. In some embodiments, DirMapScale_45 is greater than DirMapScaleTaper.

As shown in Pseudocode (30), when, for a current pixel, (i) green distortion value for the +45° angle times the 45° scaling factor is less than or equal to the green distortion value for the −45° angle (e.g., indicating a positive angle) and (ii) the blue distortion value for the +45° angle times the 45° scaling factor is less than or equal to the blue distortion value for the −45° angle (e.g., also indicating a positive angle), if (iii) the current pixel was previously marked as having a negative angle (e.g., DirMap[y][x] NEG_ANGLED), then no direction is applied for the pixel (e.g., DirMap[y][x]=NO_DIR). Otherwise, if the pixel was previously marked as having a positive angle, the positive angle is maintained. A similar determination is made for negative angle detection that can optionally change previously positive angled pixels to no direction.

As shown in Pseudocode (30), to arrive at an angle for a pixel, an additional operation of checking if the pixel has been marked with a contradicting direction is performed. If the +/−27° or +/−63° characteristics and the +/−45° or characteristics determine contradicting angles, no angle is applied. For example, if a taper angle detection (i.e., a taper angle as used herein is any of +/−27° or +/−63°) marked pixel (x, y) is marked as a positive angle and, subsequently, 45° angle detection shows signs of negative correlation or angle, the pixel is marked as no angle or direction (NO_DIR).

Discussion now turns to green pixel operations for +/−45°. With reference to FIG. 9, gradients or distortions for current pixel 902 may again be generated using pixel data from the sensor and without interpolation. In an embodiment, gradients or distortions along +/−45° are generated. In an embodiment, gradients or distortions are generated as show in Equations (31):

$$GN45=\text{abs}(G22-G33)+\text{abs}(G33-G44);$$

$$GP45=\text{abs}(G24-G33)+\text{abs}(G33-G42); \quad (31)$$

where GN45 is a green distortion value for the −45° angle and GP45 is a green distortion value for the +45° angle.

As shown, the green gradient value for the −45° angle is a sum of (i) an absolute value difference between a first layer green value in a first direction along the −45° angle line and the current pixel (i.e., abs(G22−G33)) and (ii) an absolute value difference between the current pixel and a first layer green value in an opposite direction along the −45° angle line (i.e., abs(G33−G44)). The other green distortion value is determined in a similar manner as shown in Equations (31).

In some embodiments, the previously detected positive or negative angle for the pixel based on the +/−27° or +/−63° characteristics is checked based on a positive or negative angle for the pixel detected based on the +/−45° characteristics as shown in Pseudocode (30):

```
(DirMapScale_45*GP45 <= GN45)            (32)
    (DirMap[y][x] == NEG_ANGLED)
        DirMap[y][x] = NO_DIR;
    else
        DirMap[y][x] = POS_ANGLED;
else (DirMapScale_45*GN45 <= GP45)
    (DirMap[y][x] == POS_ANGLED)
        DirMap[y][x] = NO_DIR;
    else
        DirMap[y][x] = NEG_ANGLED;
``` where, as discussed above, DirMap[y][x] is the previous angle flag for the current pixel determined using +/−27° or +/−63° characteristics (e.g., the output of Pseudocode (28)). As discussed, DirMapScale_45 is a 45° scaling factor that may be any suitable value. In some embodiments, DirMapScale_45 is the same as DirMapScaleTaper. In some embodiments, DirMapScale_45 is greater than DirMapScaleTaper.

As shown in Pseudocode (32), when, for a current pixel, (i) the green distortion value for the +45° angle times the 45° scaling factor is less than or equal to the green distortion value for the −45° angle (e.g., indicating a positive angle), if (ii) the current pixel was previously marked as having a negative angle (e.g., DirMap[y][x] NEG_ANGLED), then no direction is applied for the pixel (e.g., DirMap[y][x]=NO_DIR). Otherwise, if the pixel was previously marked as having a positive angle, the positive angle is maintained. A similar determination is made for negative angle detection that can optionally change previously positive angled pixels to no direction.

As shown in Pseudocode (32), to arrive at an angle for a pixel, an additional operation of checking if the pixel has been marked with a contradicting direction is performed. If the +/−27° or +/−63° characteristics and the +/−45° or characteristics determine contradicting angles, no angle is applied. For example, if a taper angle detection marked pixel (x, y) is marked as a positive angle and, subsequently, 45° angle detection shows signs of negative correlation or angle, the pixel is marked as no angle or direction (NO_DIR), and vice versa.

Returning to FIG. 7, process continues from operation 702 to operation 703. Notably, after operation 702, for each pixel of the input color filter array image, a determination has been made as to whether the pixel is flagged as having a positive angle (POS_ANGLED), a negative angle (NEG_ANGLED), or neither (NO_DIR). At operation, 703, for each pixel, an angle orientation is then determined to identify the angle with the highest correlation. To generate the angle orientation, the previously discussed green distortion value for the +45° angle (GP45), green distortion value for the +27° angle (GP27), green distortion value for the +63° angle (GP63), green distortion value for the −45° angle (GN45), green distortion value for the −27° angle (GN27), and green distortion value for the −63° angle (GN63) are used.

In some embodiments, for each pixel, the most highly correlated positive and negative angles are first determined. The most highly correlated positive and negative angles may be determined using any suitable technique or techniques. In an embodiment, the most highly correlated positive and negative angles are determined as shown with respect to Equations (33) as follows:

$$\text{minPosDir}=\min(GP45,GP27,GP63);$$

$$\text{minNegDir}=\min(GN45,GN27,GN63); \quad (33)$$

where minPosDir is the most highly correlated positive angle (or direction) and minNegDir is the most highly correlated negative angle (or direction).

Processing continues at operation 704, where a final direction map is generated such that the final direction map indicates a final positive or negative angle or direction for each pixel and/or a particular positive or negative angle for each pixel. In examples where the final direction map indicates a final positive or negative angle or direction for each pixel, the above most highly correlated positive or negative angle may be looked up based on the positive or negative angle for each pixel (or not used if no direction is applied).

In some embodiments, for each pixel of the image, median filtering is then applied for uniformity in detection (and to fill in gaps). In an embodiment, a 9-point median filter (e.g., on a 3×3 window of pixel directions) is applied only to locations where prior detection has not been arrived at (e.g., for no direction pixels; where DirMap[y][x]=NO_DIR) to provide a positive or negative angle for the pixel. In an embodiment, if both positive and negative directions are in the 3×3 pixel window, no median is applied for the pixel location.

Subsequent to the median filtering, a final direction map may be generated such that a final angle is assigned to each pixel only if there exists a highly correlated spatial region of pixels having similar characteristics. Such processing provides a conservative step to ensure high levels of confidence in detecting positive or negative angles and further eliminates false positives. In an embodiment, if current pixel and 4 surrounding pixels (i.e., top, left, bottom and right) have the same direction detected, then the final direction map includes the detected direction for the center pixel. If not, no direction is provided for the pixel. In some embodiments, the final direction map is generated as shown in Pseudocode (34):

```
(DirMap[y-1][x] = POS_ANGLED && DirMap[y][x-1] = POS_ANGLED && DirMap[y][x] =    (34)
    POS_ANGLED && DirMap[y][x+1] = POS_ANGLED && DirMap[y+1][x] ==
                                  POS_ANGLED)
                    FinalDirMap[y][x] = POS_ANGLED;
(DirMap[y-1][x] = NEG_ANGLED && DirMap[y][x-1] = NEG_ANGLED && DirMap[y][x] =
    NEG_ANGLED && DirMap[y][x+1] = NEG_ANGLED && DirMap[y+1][x] ==
                                  NEG_ANGLED)
                    FinalDirMap[y][x] = NEG_ANGLED;
``` where FinalDirMap[y][x] is the direction for the pixel in the final direction map, DirMap is the input direction map, POS_ANGLED indicates a positive angle, and NEG_ANGLED indicates a negative angle. As discussed, if the conditions for POS_ANGLED or NEG_ANGLED do not hold true, no angle is provided for the pixel.

Returning to FIG. 1, processing continues at operation 107 where, based on the final direction map, angle compensation is performed. In some embodiments, for each pixel of an input image, the final direction map is evaluated. If the final direction map indicates a direction for the pixel, the pixel values from a previously generated full color image (e.g., using horizontal/vertical/blend techniques discussed herein) are filtered using a filter selected based on the direction for the pixel.

Figure 10:
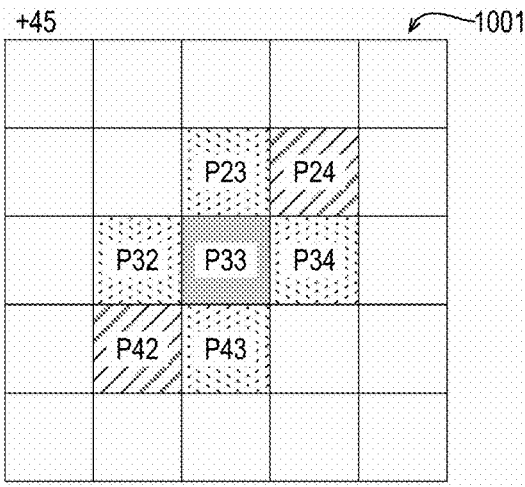
FIG. 10 illustrates example directional filters for performing directional filtering.
Figure 10:
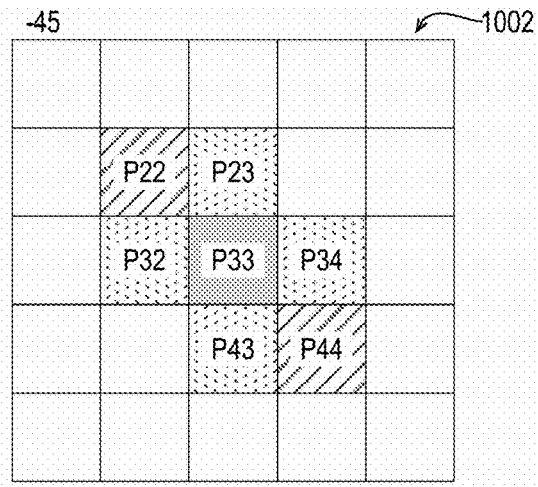
Figure 10:
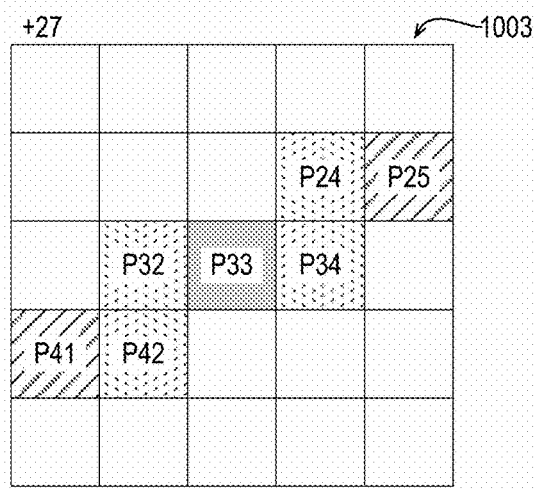
Figure 10:
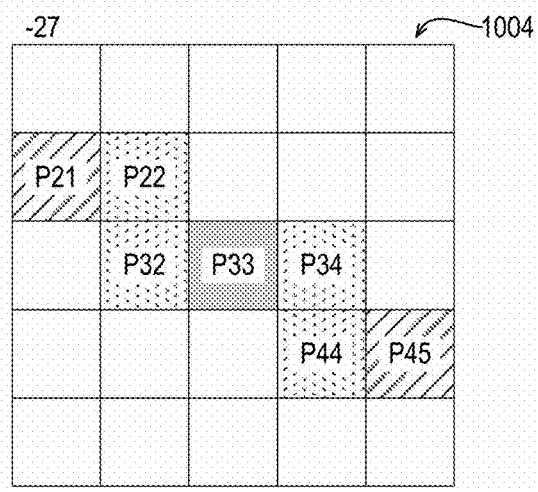
Figure 10:
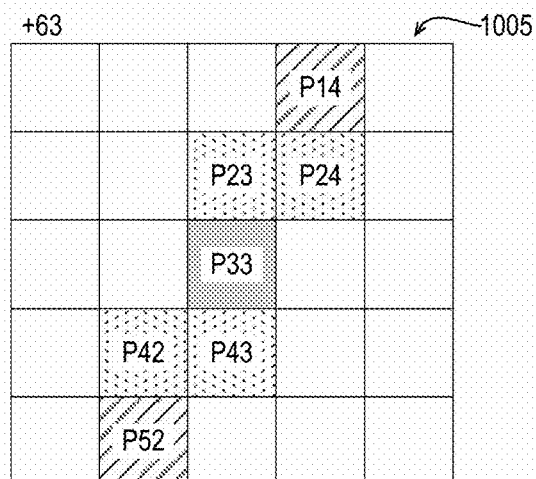
Figure 10:
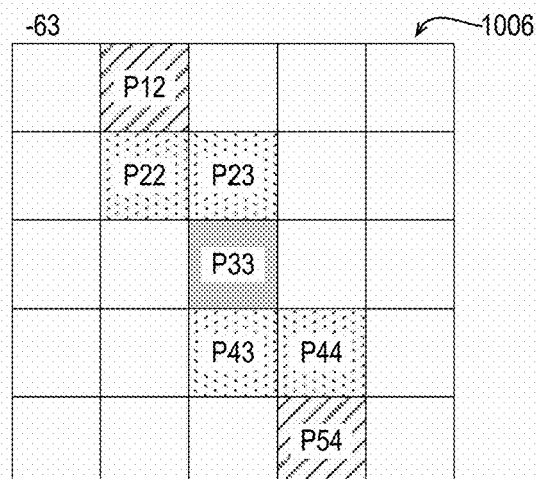

FIG. 10 illustrates example directional filters 1001-1006 for performing directional filtering, arranged in accordance with at least some implementations of the present disclosure. As shown in FIG. 10, depending on a direction angle determined for a target pixel (P33), a particular one of directional filters 1001-1006 is applied to generate an updated pixel value for the pixel. In an embodiment, the particular one of directional filters 1001-1006 is applied to each color channel of target pixel to generated filtered color channel pixels or pixel values.

In FIG. 10, the illustrated pixel backgrounds indicate filter weights with blank white and unlabeled pixels not being used in the filter, a gray background indicating the target pixel (P33) being filter and a highest filter weight, a diagonal hatched background indicating a medium filter weight, and a dotted background indicating a lowest filter weight. In an embodiment, the lowest filter weight is 1, the medium filter weight is 1.5, and the highest filter weight is greater than 1.5 up to a value of 3. Such filter weights are used in the following discussion for the sake of clarity of presentation. Furthermore, in FIG. 10, the relative pixel positions match those discussed elsewhere herein for the purpose of clarity.

As discussed, at operation 705, one of directional filters 1001-1006 is applied for each pixel indicating one of a corresponding direction of directional filters 1001-1006. As shown, each of directional filters 1001-1006 is an 8-tap filter having a direction corresponding thereto. Although illustrated with respect to 8-tap filters, directional filters using any number of filter taps may be used. Directional filters 1001-1006 generate, for any color value of target pixel P33, an output color value. In an embodiment, each of three (R, G, B) pixel values for the target pixel P33 are directionally filtered using directional filters 1001-1006. For example, the discussed horizontal, vertical, or blend interpolation may be used to generate a full color image, which may be processed and directionally filtered as discussed. In some embodiments, only interpolated values (e.g., G, B values for an R pixel off the sensor) are directionally filtered using directional filters 1001-1006.

As discussed, directional filters 1001-1006 provide one filter for each detected angle direction for a pixel (i.e., +/−27°, +/−63°, and +/−45°) such that the pertinent directional filter is substantially aligned with the detected angle. For example, directional filter 1001 is applied when the corresponding angle for pixel P33 is +45° to provide directional filtering substantially aligned with the detected angle. As shown, the output color values for pixel P33 is a weighted average of pixel P33 (wt. 3), pixel P23 (wt. 1), pixel P24 (wt. 1.5), pixel P32 (wt. 1), pixel P34 (wt. 1), pixel P42 (wt. 1.5), and pixel P43 (wt. 1). Similarly, directional filter 1002 is applied when the corresponding angle for pixel P33 is −45° to provide directional filtering substantially aligned with the detected angle, directional filter 1003 is applied when the corresponding angle for pixel P33 is +27° to provide directional filtering substantially aligned with the detected angle, directional filter 1004 is applied when the corresponding angle for pixel P33 is −27° to provide directional filtering substantially aligned with the detected angle, directional filter 1005 is applied when the corresponding angle for pixel P33 is +63° to provide directional filtering substantially aligned with the detected angle, and directional filter 1006 is applied when the corresponding angle for pixel P33 is −63° to provide directional filtering substantially aligned with the detected angle.

As discussed, directional filter 1001 generates an output pixel or color value as a weighted average of the illustrated pixel location (Pxx) and corresponding weights (as illustrated using the pixel backgrounds as discussed).

Figure 11:
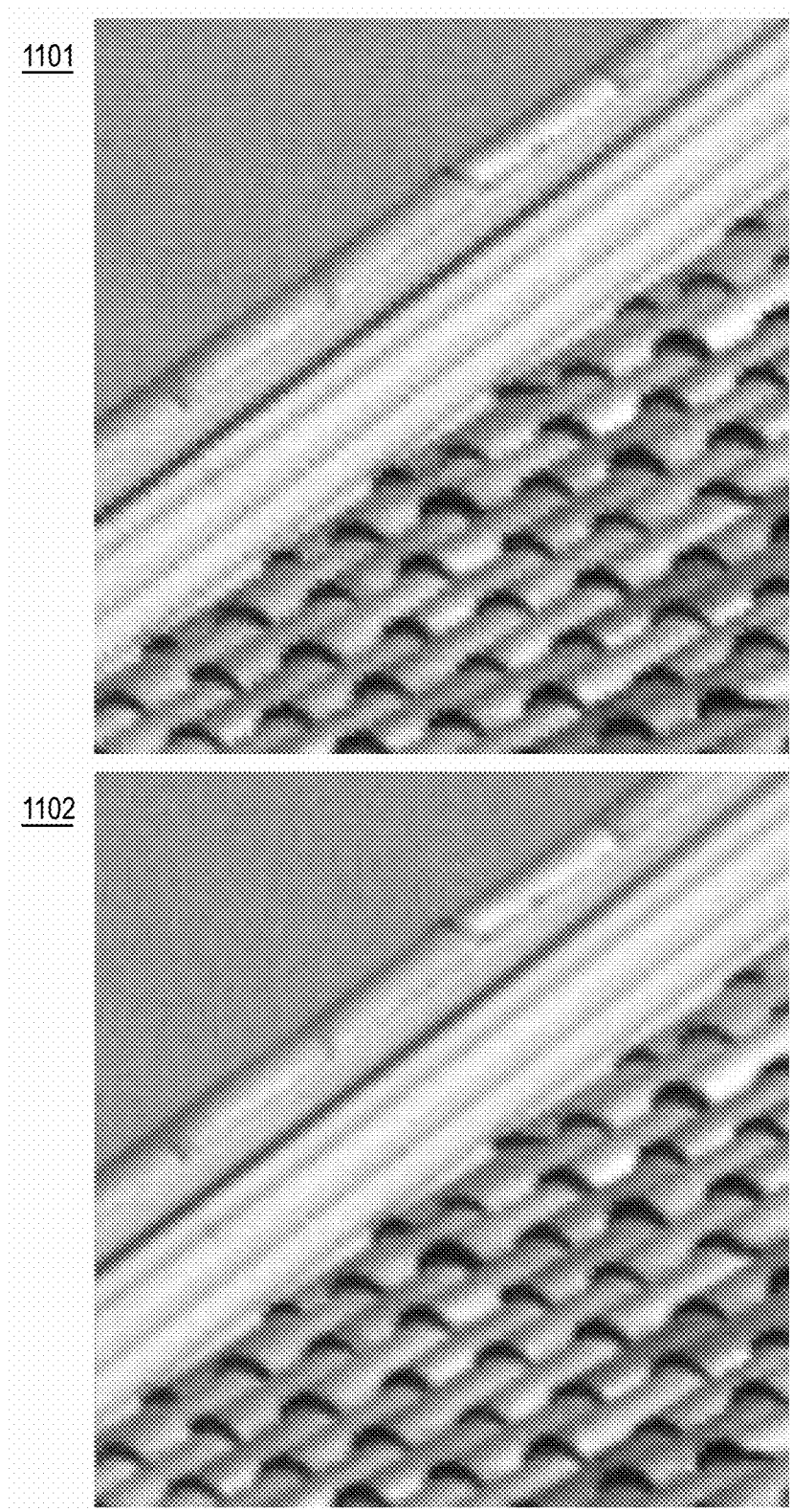
FIG. 11 illustrates an example non-directional filtered output image and an example directional filtered output image.

FIG. 11 illustrates an example non-directional filtered output image 1101 and an example directional filtered output image 1102, arranged in accordance with at least some implementations of the present disclosure. FIG. 11 provides a comparison of non-directional filtered output image 1101 with directional filtered output image 1102 generated using the techniques discussed herein. As shown in FIG. 11, directional filtered output image 1102 has significantly improved objective and subjective image quality to provide a crisper image.

Returning to FIG. 1, as shown, the resultant full color image may be optionally post processed at operation 108. In an embodiment, post processing 108 includes are two different post-processing operations. In some embodiments, the first post-processing targets noise for grey images and the second post-processing targets is for color moiré.

In some embodiments, the first noise based post processing is performed as follows. First, this post-processing is applied only when the noise level of the image is high noise image (e.g., the noise level for the image exceeds a high noise level threshold). Furthermore, only pixels that satisfy the difference condition as discussed with respect to hot pixel detection are evaluated. For example, only pixels meeting the hot pixel detection criteria discussed with respect to operation 503 are evaluated. As discussed, the hot pixel difference condition applied before global check, sanity check, or fallback conditions are applied.

Such hot pixels, as identified by operation 503 are then subjected to one or both of two conditions that may exclude them from the post-processing. In an embodiment, the first condition excludes pixels that satisfy Equation (35) as follows:

$$\max(r,g,b) \times 5/8 > \min(r,g,b) \quad (35)$$

where r, g, and b, are the red, green, and blue color values for the pixel, and 5/8 is a predefined factor.

In an embodiment, the second condition excludes pixels that use a 5×5 pixel window as discussed above with respect to operation 601.

For the remaining pixels that are hot pixels and do not satisfy the discussed conditions, the post processing uses a weighted sum. For example, assuming the calculation of a G (green color value) for a R pixel (e.g., a red pixel off the sensor, G may be determined as shown in Equations (36) as follows:

$$G33 = R33 + \text{Sum\_Weight\_Diff}/\text{Sum\_Weight}$$

$$\text{Sum\_Weight} = W[0] + W[1] + W[2] + W[3]$$

$$\text{Sum\_Weight\_Diff} = W[0]^* \text{abs}(G23-R23) + W[1] \text{abs}(G34-R34) + W[2]^*(G43-R43) + W[3]^*(G32-R32)$$

$$W[0] = 1/(1 + \text{abs}(G23-G13) + \text{abs}(G23-G24) + \text{abs}(G23-G33) + \text{abs}(G23-G22))$$

$$W[1] = 1/(1 + \text{abs}(G34-G24) + \text{abs}(G34-G35) + \text{abs}(G34-G44) + \text{abs}(G34-G33))$$

$$W[2] = 1/(1 + \text{abs}(G43-G33) + \text{abs}(G43-G44) + \text{abs}(G43-G53) + \text{abs}(G43-G42))$$

$$W[3] = 1/(1 + \text{abs}(G32-G22) + \text{abs}(G32-G33) + \text{abs}(G32-G42) + \text{abs}(G32-G31))$$

$$W[0] = W[2] = 0; \text{ if Horz interpolation used}$$

$$W[1] = W[3] = 0; \text{ if Vert interpolation used} \quad (36)$$

where G33 is the green value for the pixel, R33 is the red value for the pixel, Sum_Weight_Diff is a sum of weighted difference values, and Sum_Weight is a sum of weights, defined as shown in Equations (36).

In some embodiments, to determine a green value for a blue pixel, R is changed to B in Equations (36). Furthermore, Equations (36) may be extended using similar techniques to determine a red value for a blue pixel, a blue value for a red pixel, a red value for a green pixel, and a blue value for a green pixel.

Discussion now turns to the second post-processing to target color moiré. In some embodiments, the color moiré based post-processing is performed as follows. In some embodiments, such color moiré based post-processing is not noise level dependent but is instead applied to all images. In an embodiment, a first correction is for black/white dot correction such that corrected pixels are corrected using a neighbor value. In an embodiment, when a current pixel is either 0 or 255 value in any of the R, G, and B channels, an average value for any such R, G, and B is used based on averaging the color values in a 3 by 3 window and replacing the current pixel value (e.g., 0 or 255) with the average value.

In some embodiments, a second correction uses a green value in a pixel. If the green value in the pixel is the dominate color in the pixel (e.g., the green value exceeds both the red and blue value by a threshold amount), red and blue are changed values based on the green value and neighbor pixel values. In some embodiments, for the color correction, a 5 by 5 window is used. If the current green and neighbor green values are similar (e.g., between 0.5× to 2×) and a difference between red (or blue) and green for the current pixel and a difference between red (or blue) and green for the neighbor pixel are also within the same range, the neighbor pixels are used to average red (or blue) and average green. After calculating average red (or blue) and average green within the 5 by 5 window, correction is applied. In some embodiments, the range is varied with the average green value. In an embodiment, correction is applied as shown in Equations (37):

$$R'(x,y) = G(x,y)^* \text{Average\_R}/\text{Average\_G}$$

$$B'(x,y) = G(x,y)^* \text{Average\_B}/\text{Average\_G} \quad (37)$$

where R' is the updated red value, G is the green value for the pixel, Average_R is the average red value within the window, Average_G is the average green value within the window, B' is the updated blue value, and Average_B is the average blue value within the window.

In some embodiments, one, two, or all of three fallback modes for the pixel are also applied. The first fallback condition or mode uses canny edge. In an embodiment, a size of a horizontal canny edge filtering value and a vertical canny edge value are compared. A resultant comparison value, HV is provided. In some embodiments, HV is 1 (0) if horizontal (vertical) canny edge value is larger than vertical (horizontal) canny edge value. Furthermore, a counter increased if the HV of the current pixel and the HV of neighbors within the 5 by 5 window is different. In some embodiments, if the counter is greater than 3, the pixel falls back to its original color values and no correction is applied.

The second fallback condition or mode uses a Diff_3×3 value and a Sum_RGB value where Diff_3×3 is a sum of absolute difference between R, G, and B for a current pixel and R, G, and B for neighbor pixels in a 3 by 3 window around the current pixel and Sum_RGB is a sum of R, B, and G for the current pixel. In an embodiment, if Diff_3×3 is less than or equal to Sum_RGB, the pixel falls back to its original color values and no correction is applied.

The last fallback condition or mode uses a counter that is increased by one for any pixel in a 5 by 5 neighborhood having a green value that is very small as compared to the red and blue values for the pixel as shown in Pseudocode (38):

$$\text{If}(2^* \max(R,B) > 3^*G \text{ \&\& } (\max(R,B) > 2^* \min(R,G) || G <= \min(R,B))) \quad (38)$$
$$\text{Counter++}$$

where R is a red value for a pixel, B is a blue value for the pixel, G is a green value for the pixel and Counter is the discussed counter variable.

When the counter is larger than a threshold e.g., 3), the pixel falls back to its original color values and no correction is applied. As discussed, any of the discussed three fallback conditions or modes may be applied.

The resultant full color image may be output such that, as used herein, the term output or presentment with respect to an image or image data indicates saving to memory for later display, presentment to a user via a display, or transmission to another device for eventual display.

Figure 12:
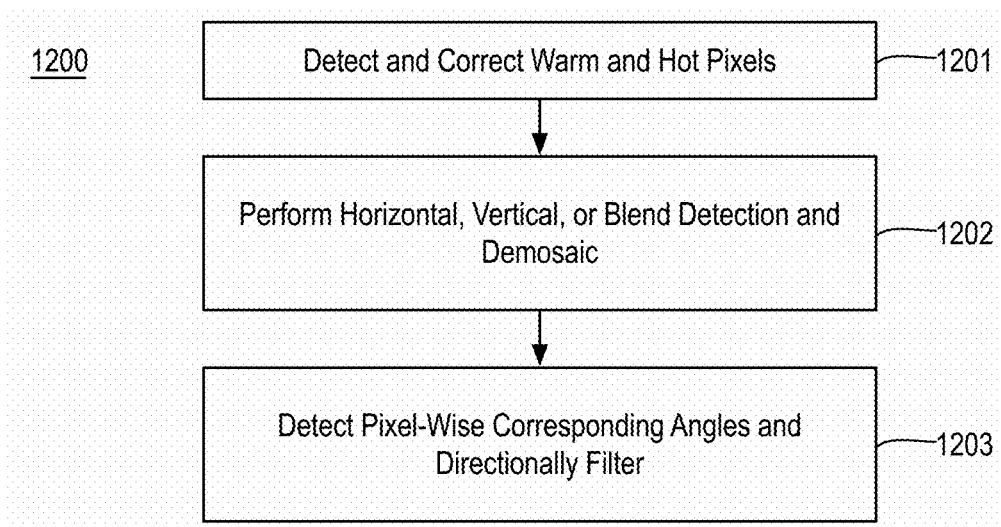
FIG. 12 is a flow diagram illustrating an example process for demosaicing an input color filter array image to generate a full color image.

FIG. 12 is a flow diagram illustrating an example process 1200 for demosaicing an input color filter array image to generate a full color image, arranged in accordance with at least some implementations of the present disclosure. Process 1200 may include one or more operations 1201-1203 as illustrated in FIG. 12. Process 1200 may form at least part of a demosaicing process. By way of non-limiting example, process 1200 may form at least part of a demosaicing process performed by a device of any suitable form factor. For example, process 1200 will be described herein with reference to system 1300 of FIG. 12.

Figure 13:
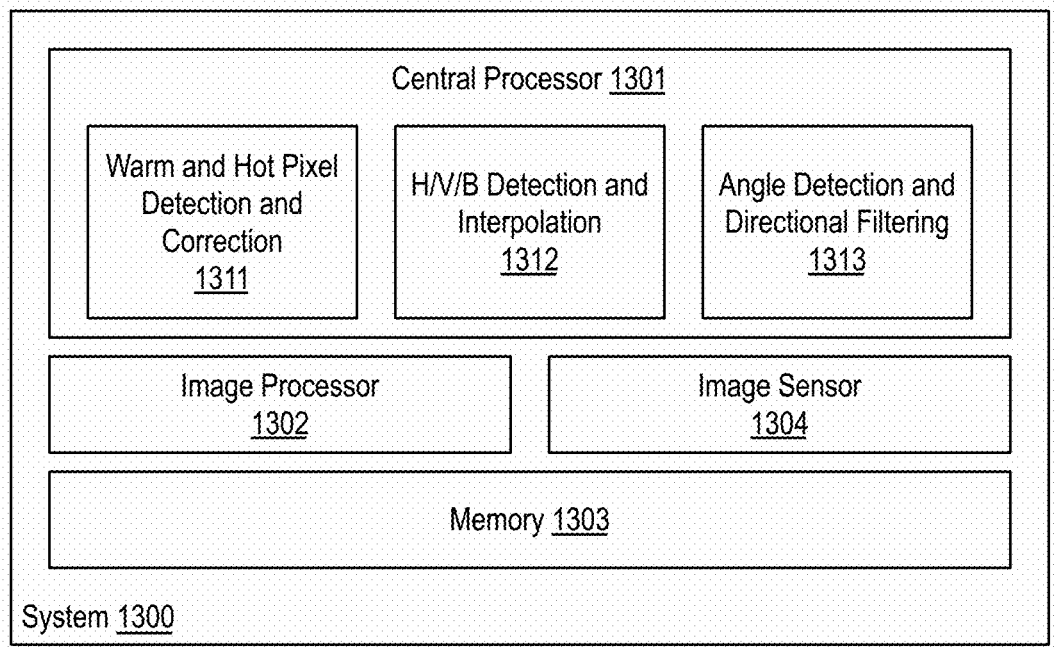
FIG. 13 is an illustrative diagram of an example system for demosaicing an input color filter array image to generate a full color image.

FIG. 13 is an illustrative diagram of an example system 1300 for demosaicing an input color filter array image to generate a full color image, arranged in accordance with at least some implementations of the present disclosure. As shown in FIG. 13, system 1300 may include a central processor 1301, an image processor 1302, a memory 1303, and an image sensor 1304. Also as shown, central processor 1201 may include or implement a warm and hot pixel detection and correction module 1311, a horizontal, vertical, or blend (H/V/B) detection and interpolation module 1312, and an angle detection and directional filtering module 1313. For example, warm and hot pixel detection and correction module 1311 may perform any techniques discussed with respect to operation 1201, H/V/B detection and interpolation module 1312 may perform any techniques discussed with respect to operation 1202, and angle detection and directional filtering module 1313 may perform any techniques discussed with respect to operation 1203.

In an embodiment, one or more of warm and hot pixel detection and correction module 1311, H/V/B detection and interpolation module 1312, and angle detection and directional filtering module 1313 are implemented via image processor 1302. Furthermore, memory 1203 may store input image data, output image data, pixel values, factors, thresholds, or any other data discussed herein. Image processor 1302 may include any number and type of graphics or image processing units that may provide operations as discussed herein. In some examples, image processor 1302 may be an image signal processor. Such operations may be implemented via software or hardware or a combination thereof. For example, image processor 1302 may include circuitry dedicated to manipulate image data obtained from memory 1303. Central processor 1301 may include any number and type of processing units or modules that may provide control and other high level functions for system 1300 and/or provide any operations as discussed herein. Memory 1303 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1203 may be implemented by cache memory.

In an embodiment, one or more or portions of warm and hot pixel detection and correction module 1311, a horizontal, vertical, or blend (H/V/B) detection and interpolation module 1312, and an angle detection and directional filtering module 1313 are implemented via an execution unit (EU). The EU may include, for example, programmable logic or circuitry such as a logic core or cores that may provide a wide array of programmable logic functions. In an embodiment, one or more or portions of warm and hot pixel detection and correction module 1311, a horizontal, vertical, or blend (H/V/B) detection and interpolation module 1312, and an angle detection and directional filtering module 1313 are implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of warm and hot pixel detection and correction module 1311, a horizontal, vertical, or blend (H/V/B) detection and interpolation module 1312, and an angle detection and directional filtering module 1313 are implemented via an application specific integrated circuit (ASIC). The ASIC may include an integrated circuitry customized to perform the operations discussed herein.

Returning to discussion of FIG. 12, process 1200 may begin at operation 1201, where hot and/or warm pixels are detected and corrected. In an embodiment, operation 1201 includes receiving a color filter array image, the color filter array image including a current pixel (or target pixel) of a first color (e.g., one of red, blue, or green) at a center of a pixel neighborhood (or window) around the current pixel such that the pixel neighborhood includes first neighbor pixels of the first color (e.g., red), second neighbor pixels of a second color (e.g., blue), and third neighbor pixels of a third color (e.g., green). In an embodiment, operation 1201 includes determining, for the current pixel, a current pixel minimum difference value based on differences between the current pixel and the first neighbor pixels within the neighborhood. In an embodiment, the current pixel minimum difference value is a minimum of absolute value differences between the current pixel and each of the first neighbor pixels (i.e., of the first color) within the neighborhood. In an embodiment, operation 1201 includes determining, for the current pixel, a first color maximum difference value based on differences between the first neighbor pixels within the neighborhood. In an embodiment, the first color maximum difference value is a minimum of absolute value differences between the current pixel and each of the first neighbor pixels within the neighborhood.

In an embodiment, operation 1201 includes detecting the current pixel as a warm pixel in response to the first color maximum difference value being less than the current pixel minimum difference value, a noise level of the color filter array image exceeding a first threshold, and the first color maximum difference value and the current pixel minimum difference value both being less than a second threshold. In an embodiment, operation 1201 includes correcting the current pixel to a corrected current pixel in response to the current pixel being detected as a warm pixel. In an embodiment, operation 1201 includes outputting a full color image including the corrected current pixel value. In an embodiment, the corrected current pixel is an average of at least some of the first neighbor pixels.

In an embodiment, operation 1201 includes fallback modes for the warm pixel. In an embodiment, operation 1201 includes counting each instance of a difference between the current pixel and one of the first neighbor pixels exceeding a difference between the current pixel and an intervening pixel of one of the second neighbor pixels or third neighbor pixels between the current pixel and the one of the first neighbor pixels to generate a count and resetting the current pixel from the corrected current pixel in response to the count exceeding a threshold. In an embodiment, operation 1201 includes determining a second current pixel minimum difference value based on differences between the current pixel and the second and third neighbor pixels within the neighborhood that are immediate neighbors of the current pixel and resetting the current pixel from the corrected current pixel in response to the current pixel minimum difference value exceeding the second current pixel minimum difference value and the noise level of the color filter array image exceeding a third threshold greater than the first threshold.

In an embodiment, operation 1201 includes hot pixel detection. In an embodiment, the hot pixel detection includes determining a horizontal and a vertical second order first color gradient value for the neighborhood based on minimums of differences between the differences between the first neighbor pixels within the neighborhood exclusive of the current pixel, determining a horizontal and a vertical second order current pixel based gradient value for the current pixel based on minimums of differences between the differences between the current pixel and the first neighbor pixels and the differences between the first neighbor pixels, detecting the current pixel as a hot pixel in response to, when the horizontal second order first color gradient value is less than the vertical second order first color gradient value, a maximum of the current pixel and the first neighbor pixels multiplied by a factor being less than the horizontal second order first color gradient value, and correcting the current pixel to a second corrected current pixel in response to the current pixel being detected as a hot pixel. In an embodiment, operation 1201 includes detecting the current pixel as a hot pixel in response to, when the horizontal second order first color gradient value exceeds the vertical second order first color gradient value, the horizontal second order first color gradient value multiplied by a second factor being less than the horizontal second order first color gradient value such that the second factor is greater than the factor.

In an embodiment, the hot pixel detection also includes fallback modes. In an embodiment, operation 1201 includes determining a first layer average as an average of second and third neighbor pixels immediately neighboring the current pixel, a second layer average as an average of the first, second, and third neighbor pixels that are secondary neighbors of the current pixel, and a second layer first color average as an average of the first neighbor pixels that are secondary neighbors of the current pixel and resetting the current pixel from the second corrected current pixel in response to the second layer first color average multiplied by a second factor exceeding the current pixel and the first layer average multiplied by a third factor exceeding the second layer average multiplied by a fourth factor.

Processing may continue at operation 1202, where horizontal, vertical, or blend detection and demosaic (e.g., interpolation) based on the detected mode are performed. In an embodiment, operation 1202 includes receiving a color filter array image, the color filter array image including a current pixel (or target pixel) of a first color (e.g., one of red, blue, or green) at a center of a pixel window around the current pixel that includes a plurality of pixels (of various colors), selecting one of a horizontal, vertical, or blend interpolation mode for the current pixel, and interpolating a second color for the current pixel using the selected interpolation mode. In an embodiment, operation 1202 further includes outputting a full color image comprising the second color for the current pixel.

In an embodiment, selecting one of a horizontal, vertical, or blend interpolation mode for the current pixel includes determining a left side horizontal differences value using pixels aligned with and to the left of the current pixel in the pixel window, a right side horizontal differences value using pixels aligned with and to the right of the current pixel in the pixel window, a top side vertical differences value using pixels aligned with and above the current pixel in the pixel window, and a bottom side vertical differences value using pixels aligned with and below the current pixel in the pixel window, generating a vertical differences value for the pixel window using the top and bottom side vertical differences values and a horizontal differences value for the pixel window using the left and right side horizontal differences values, and selecting the horizontal interpolation mode in response to the horizontal differences value being less than the vertical differences value times a color tolerance factor that is less than one, selecting the vertical interpolation mode in response to the vertical differences value being less than the horizontal differences value times the color tolerance factor, or selecting the blend interpolation mode otherwise.

In an embodiment, the vertical differences value is a weighted sum of a minimum of the top and bottom side vertical differences values and a maximum of the top and bottom side vertical differences values and/or the horizontal differences value is a weighted sum of a minimum of the left and right side horizontal differences values and a maximum of the left and right side horizontal differences values. In an embodiment, operation 1202 further includes selecting the horizontal interpolation mode in response to the horizontal differences value being less than the vertical differences value and each pixel within a 3×3 window of the current pixel having a greater vertical differences value than horizontal differences value and the color filter array image being a low or medium noise image. In an embodiment, operation 1202 further includes selecting the vertical interpolation mode in response to the vertical differences value being less than the horizontal differences value and each pixel within a 3×3 window of the current pixel having a greater horizontal differences value than vertical differences value and the color filter array image being a low or medium noise image.

In an embodiment, the pixel window is a 7×7 pixel window around the current pixel, and the left side horizontal differences value, the right side horizontal differences value, the top side vertical differences value, and the bottom side vertical differences value are generated using only pixels of the first color. In an embodiment, the pixel window is a 5×5 pixel window around the current pixel, and the left side horizontal differences value, the right side horizontal differences value, the top side vertical differences value, and the bottom side vertical differences value are generated using pixels of the first color, the second color, and a third color. In some embodiments, operation 1202 further includes selecting a size of the pixel window based on an image noise of the color filter array image and a minimum of horizontal color differences and vertical color differences within a 5×5 window of the current pixel, such that the horizontal and vertical color differences are generated using only pixels of the first color.

Processing may continue at operation 1203, where pixel-wise angle detection and directional filtering are performed. In an embodiment, operation 1203 includes determining, for a current pixel of a color filter array image, a first distortion value for an acute angle relative to a first direction along a horizontal of the color filter array image and a second distortion value for the acute angle relative to a second direction, opposite the first direction, along the horizontal, detecting the current pixel has a corresponding angle substantially aligned with the acute angle along the first direction based on the first distortion value times a factor being less than the second distortion value, directionally filtering a color value of the current pixel to generate an output color value for the current pixel, wherein the directional filtering is substantially aligned with the corresponding angle, and outputting a full color image comprising the output color value.

In an embodiment, operation 1203 further includes determining, for the current pixel, a third distortion value for a second acute angle relative to the first direction and a fourth distortion value for the second acute angle relative to the second direction, such that detecting the pixel has the corresponding angle is responsive to the first distortion value times the factor being less than the second distortion value or the third distortion value times the factor being less than the fourth distortion value. In an embodiment, the acute angle is 27 degrees and the second acute angle is 63 degrees.

In an embodiment, operation 1203 further includes determining, for a second pixel of a color filter array image, a third distortion value for the acute angle relative to the first direction, a fourth distortion value for the acute angle relative to the second direction, a fifth distortion value for a second acute angle relative to the first direction and a sixth distortion value for the second acute angle relative to the second direction and skipping directional filtering of the second pixel in response to the third distortion value times the factor being less than the fourth distortion value and the fifth distortion value times a second factor being greater than the sixth distortion value, wherein the second factor is greater than the factor. In an embodiment, the first pixel is a red pixel and determining the first distortion value comprises interpolating an interpolated green pixel based on the acute angle and differencing a first green pixel that is a secondary neighbor of the red pixel and the interpolated green pixel. In an embodiment, directionally filtering the color value comprises applying a multi-tap filter selected based on one of the acute angle or one or more other acute angles relative the first direction having a lowest distortion value. In an embodiment, operation 1203 further includes verifying, prior to the directional filtering, each of a pixel above, a pixel below, a pixel to the right, and a pixel to the left of the current pixel all have the same angle corresponding thereto.

Process 1200 may be repeated any number of times either in series or in parallel for any number of input color filter array images or portions thereof. Process 1200 provides for image demosaicing that is automated, computationally efficient, and provides improved image quality in terms of subjective and objective image quality.

Process 1200 may be implemented by any suitable device, system, or platform such as those discussed herein. In an embodiment, process 1200 is implemented by an apparatus having a memory to store input images or image data, as well as any other discussed data structure, and a processor to perform operations 1201-1203. In an embodiment, the memory and the processor are implemented via a monolithic field programmable gate array integrated circuit. As used herein, the term monolithic indicates a device that is discrete from other devices, although it may be coupled to other devices for communication and power supply.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a multi-function device or a computing system such as, for example, a laptop computer, a tablet, or a smart phone. Those skilled in the art may recognize that systems described herein may include additional components that have not been depicted in the corresponding figures. For example, the systems discussed herein may include additional components such as image pre-processing circuitry, memory controllers, or the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement any operation discussed herein or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 14:
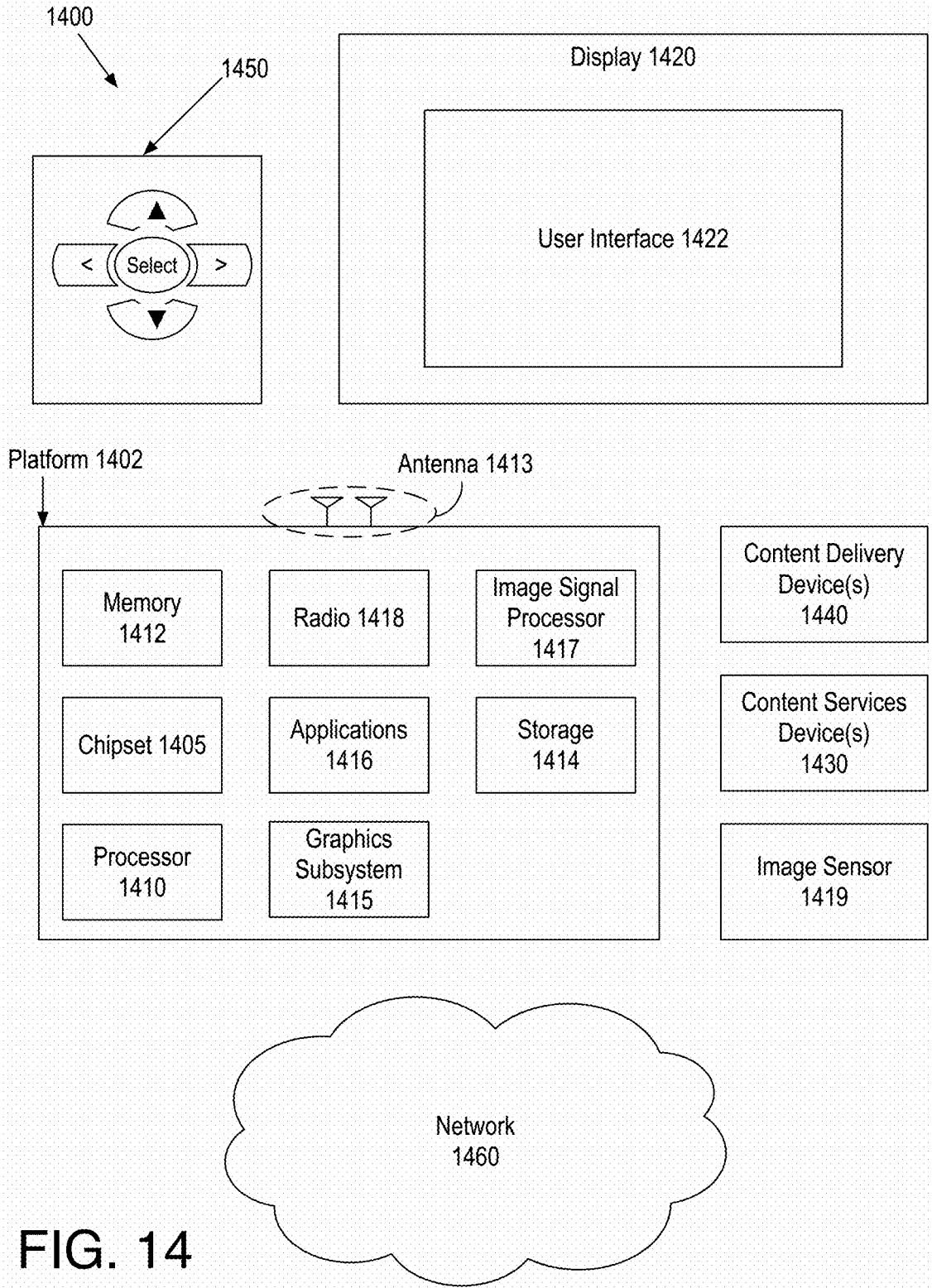
FIG. 14 is an illustrative diagram of an example system.

FIG. 14 is an illustrative diagram of an example system 1400, arranged in accordance with at least some implementations of the present disclosure. In various implementations, system 1400 may be a computing system although system 1400 is not limited to this context. For example, system 1400 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), wearable device (e.g., smart watch or smart glasses), mobile internet device (MID), messaging device, data communication device, peripheral device, scanner, printer, multi-function device, and so forth.

In various implementations, system 1400 includes a platform 1402 coupled to a display 1420. Platform 1402 may receive content from a content device such as content services device(s) 1430 or content delivery device(s) 1440 or other content sources such as an image sensor 1419. For example, platform 1402 may receive raw image data from image sensor 1419 or any other content source. A navigation controller 1450 including one or more navigation features may be used to interact with, for example, platform 1402 and/or display 1420. Each of these components is described in greater detail below.

In various implementations, platform 1402 may include any combination of a chipset 1405, processor 1410, memory 1412, antenna 1413, storage 1414, graphics subsystem 1415, applications 1416, image signal processor 1417 and/or radio 1418. Chipset 1405 may provide intercommunication among processor 1410, memory 1412, storage 1414, graphics subsystem 1415, applications 1416, image signal processor 1417 and/or radio 1418. For example, chipset 1405 may include a storage adapter (not depicted) capable of providing intercommunication with storage 1414.

Processor 1410 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1410 may be dual-core processor(s), dual-core mobile processor(s), and so forth.

Memory 1412 may be implemented as a volatile memory device such as, but not limited to, a Random Access Memory (RAM), Dynamic Random Access Memory (DRAM), or Static RAM (SRAM).

Storage 1414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1414 may include technology to increase the storage performance enhanced protection for valuable digital media when multiple hard drives are included, for example.

Image signal processor 1417 may be implemented as a specialized digital signal processor or the like used for image processing. In some examples, image signal processor 1417 may be implemented based on a single instruction multiple data or multiple instruction multiple data architecture or the like. In some examples, image signal processor 1417 may be characterized as a media processor. As discussed herein, image signal processor 1417 may be implemented based on a system on a chip architecture and/or based on a multi-core architecture.

Graphics subsystem 1415 may perform processing of images such as still or video for display. Graphics subsystem 1415 may be a graphics processing unit (GPU), a visual processing unit (VPU), or an image processing unit, for example. In some examples, graphics subsystem 1415 may perform scanned image rendering as discussed herein. An analog or digital interface may be used to communicatively couple graphics subsystem 1415 and display 1420. For example, the interface may be any of a High-Definition Multimedia Interface, DisplayPort, wireless HDMI, and/or wireless HD compliant techniques. Graphics subsystem 1415 may be integrated into processor 1410 or chipset 1405. In some implementations, graphics subsystem 1415 may be a stand-alone device communicatively coupled to chipset 1405.

The graphics and/or video processing techniques described herein may be implemented in various hardware architectures. For example, graphics and/or video functionality may be integrated within a chipset. Alternatively, a discrete graphics and/or image processor and/or application specific integrated circuit may be used. As still another implementation, the graphics and/or video functions may be provided by a general purpose processor, including a multi-core processor. In further embodiments, the functions may be implemented in a consumer electronics device.

Radio 1418 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1418 may operate in accordance with one or more applicable standards in any version.

In various implementations, display 1420 may include any flat panel monitor or display. Display 1420 may include, for example, a computer display screen, touch screen display, video monitor, television-like device, and/or a television. Display 1420 may be digital and/or analog. In various implementations, display 1420 may be a holographic display. Also, display 1420 may be a transparent surface that may receive a visual projection. Such projections may convey various forms of information, images, and/or objects. For example, such projections may be a visual overlay for a mobile augmented reality (MAR) application. Under the control of one or more software applications 1416, platform 1402 may display user interface 1422 on display 1420.

In various implementations, content services device(s) 1430 may be hosted by any national, international and/or independent service and thus accessible to platform 1402 via the Internet, for example. Content services device(s) 1430 may be coupled to platform 1402 and/or to display 1420. Platform 1402 and/or content services device(s) 1430 may be coupled to a network 1460 to communicate (e.g., send and/or receive) media information to and from network 1460. Content delivery device(s) 1440 also may be coupled to platform 1402 and/or to display 1420.

In various implementations, content services device(s) 1430 may include a cable television box, personal computer, network, telephone, Internet enabled devices or appliance capable of delivering digital information and/or content, and any other similar device capable of uni-directionally or bi-directionally communicating content between content providers and platform 1402 and/display 1420, via network 1460 or directly. It will be appreciated that the content may be communicated uni-directionally and/or bi-directionally to and from any one of the components in system 1400 and a content provider via network 1460. Examples of content may include any media information including, for example, video, music, medical and gaming information, and so forth.

Content services device(s) 1430 may receive content such as cable television programming including media information, digital information, and/or other content. Examples of content providers may include any cable or satellite television or radio or Internet content providers. The provided examples are not meant to limit implementations in accordance with the present disclosure in any way.

Image sensor 1419 may include any suitable image sensor that may provide raw image data based on a scene. For example, image sensor 1419 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensor 1419 may include any device that may detect information of a scene to generate raw image data. As discussed, in some examples, system 1400 may include multiple image sensors, which may be the same or different. In some examples, image sensor 1419 may provide image capture processing or logic associated with image sensor 1419 (not shown) may provide such image capture processing. In other examples, the image capture processing discussed herein may be performed via platform 1402.

In various implementations, platform 1402 may receive control signals from navigation controller 1450 having one or more navigation features. The navigation features of navigation controller 1450 may be used to interact with user interface 1422, for example. In various embodiments, navigation controller 1450 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1450 may be replicated on a display (e.g., display 1420) by movements of a pointer, cursor, focus ring, or other visual indicators displayed on the display. For example, under the control of software applications 1416, the navigation features located on navigation controller 1450 may be mapped to virtual navigation features displayed on user interface 1422, for example. In various embodiments, navigation controller 1450 may not be a separate component but may be integrated into platform 1402 and/or display 1420. The present disclosure, however, is not limited to the elements or in the context shown or described herein.

In various implementations, drivers (not shown) may include technology to enable users to instantly turn on and off platform 1402 like a television with the touch of a button after initial boot-up, when enabled, for example. Program logic may allow platform 1402 to stream content to media adaptors or other content services device(s) 1430 or content delivery device(s) 1440 even when the platform is turned "off." In addition, chipset 1405 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1400 may be integrated. For example, platform 1402 and content services device(s) 1430 may be integrated, or platform 1402 and content delivery device(s) 1440 may be integrated, or platform 1402, content services device(s) 1430, and content delivery device(s) 1440 may be integrated, for example. In various embodiments, platform 1402 and display 1420 may be an integrated unit. Display 1420 and content service device(s) 1430 may be integrated, or display 1420 and content delivery device(s) 1440 may be integrated, for example. These examples are not meant to limit the present disclosure.

In various embodiments, system 1400 may be implemented as a wireless system, a wired system, or a combination of both. When implemented as a wireless system, system 1400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1400 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1402 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 14.

Figure 15:
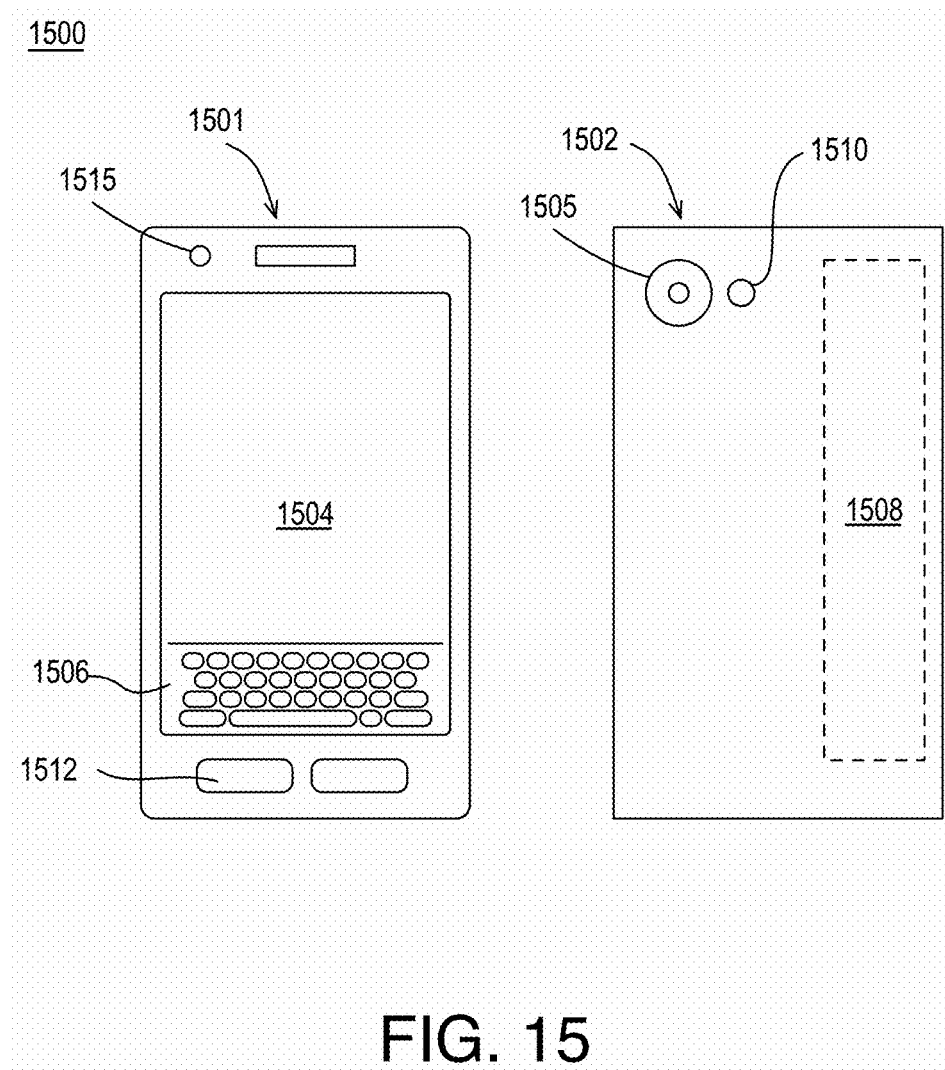
FIG. 15 illustrates an example small form factor device, all arranged in accordance with at least some implementations of the present disclosure.

As described above, system 1400 may be embodied in varying physical styles or form factors. FIG. 15 illustrates an example small form factor device 1500, arranged in accordance with at least some implementations of the present disclosure. In some examples, system 1400 may be implemented via device 1500. In other examples, other devices or systems, or portions thereof may be implemented via device 1500. In various embodiments, for example, device 1500 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 15, device 1500 may include a housing with a front 1501 and a back 1502. Device 1500 includes a display 1504, an input/output (I/O) device 1506, and an integrated antenna 1508. Device 1500 also may include navigation features 1512. I/O device 1506 may include any suitable I/O device for entering information into a mobile computing device. Examples for I/O device 1506 may include an alphanumeric keyboard, a numeric keypad, a touch pad, input keys, buttons, switches, microphones, speakers, voice recognition device and software, and so forth. Information also may be entered into device 1500 by way of microphone (not shown), or may be digitized by a voice recognition device. As shown, device 1500 may include a camera 1505 (e.g., including a lens, an aperture, and an imaging sensor) and a flash 1510 integrated into back 1502 (or elsewhere) of device 1500 and a camera 1515 integrated into front 1501 of device 1500. Camera 1505 and flash 1510 and/or camera 1515 may be components of a camera module to originate image data processed into streaming video that is output to display 1504 and/or communicated remotely from device 1500 via antenna 1508 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for demosaicing comprises receiving a color filter array image, wherein the color filter array image comprises a current pixel of a first color at a center of a pixel neighborhood around the current pixel, the pixel neighborhood comprising first neighbor pixels of the first color, second neighbor pixels of a second color, and third neighbor pixels of a third color, determining, for the current pixel, a current pixel minimum difference value based on differences between the current pixel and the first neighbor pixels within the neighborhood, determining, for the current pixel, a first color maximum difference value based on differences between the first neighbor pixels within the neighborhood, detecting the current pixel as a warm pixel in response to the first color maximum difference value being less than the current pixel minimum difference value, a noise level of the color filter array image exceeding a first threshold, and the first color maximum difference value and the current pixel minimum difference value both being less than a second threshold, and correcting the current pixel to a corrected current pixel in response to the current pixel being detected as a warm pixel.

In one or more second embodiments, further to the first embodiments, the current pixel minimum difference value comprises a minimum of absolute value differences between the current pixel and each of the first neighbor pixels within the neighborhood and the first color maximum difference value comprises a maximum of absolute value differences between each horizontal and vertical pair of the first neighbor pixels exclusive of the current pixel.

In one or more third embodiments, further to the first or second embodiments, the method further comprises counting each instance of a difference between the current pixel and one of the first neighbor pixels exceeding a difference between the current pixel and an intervening pixel of one of the second neighbor pixels or third neighbor pixels between the current pixel and the one of the first neighbor pixels to generate a count and resetting the current pixel from the corrected current pixel in response to the count exceeding a threshold.

In one or more fourth embodiments, further to the first through third embodiments, the method further comprises determining a second current pixel minimum difference value based on differences between the current pixel and the second and third neighbor pixels within the neighborhood that are immediate neighbors of the current pixel and resetting the current pixel from the corrected current pixel in response to the current pixel minimum difference value exceeding the second current pixel minimum difference value and the noise level of the color filter array image exceeding a third threshold greater than the first threshold.

In one or more fifth embodiments, further to the first through fourth embodiments, the corrected current pixel comprises an average of at least some of the first neighbor pixels and the method further comprises outputting a full color image comprising the corrected current pixel value.

In one or more sixth embodiments, further to the first through fifth embodiments, the method further comprises determining a horizontal and a vertical second order first color gradient value for the neighborhood based on minimums of differences between the differences between the first neighbor pixels within the neighborhood exclusive of the current pixel, determining a horizontal and a vertical second order current pixel based gradient value for the current pixel based on minimums of differences between the differences between the current pixel and the first neighbor pixels and the differences between the first neighbor pixels, detecting the current pixel as a hot pixel in response to, when the horizontal second order first color gradient value is less than the vertical second order first color gradient value, a maximum of the current pixel and the first neighbor pixels multiplied by a factor being less than the horizontal second order first color gradient value, and correcting the current pixel to a second corrected current pixel in response to the current pixel being detected as a hot pixel.

In one or more seventh embodiments, further to the first through sixth embodiments, the method further comprises detecting the current pixel as a hot pixel in response to, when the horizontal second order first color gradient value exceeds the vertical second order first color gradient value, the horizontal second order first color gradient value multiplied by a second factor being less than the horizontal second order first color gradient value, wherein the second factor is greater than the factor.

In one or more eighth embodiments, further to the first through seventh embodiments, the method further comprises determining a first layer average as an average of second and third neighbor pixels immediately neighboring the current pixel, a second layer average as an average of the first, second, and third neighbor pixels that are secondary neighbors of the current pixel, and a second layer first color average as an average of the first neighbor pixels that are secondary neighbors of the current pixel and resetting the current pixel from the second corrected current pixel in response to the second layer first color average multiplied by a second factor exceeding the current pixel and the first layer average multiplied by a third factor exceeding the second layer average multiplied by a fourth factor.

In one or more ninth embodiments, a method for demosaicing comprises receiving a color filter array image, wherein the color filter array image comprises a current pixel of a first color at a center of a pixel window around the current pixel, the pixel window comprising a plurality of pixels, selecting one of a horizontal, vertical, or blend interpolation mode for the current pixel by determining a left side horizontal differences value using pixels aligned with and to the left of the current pixel in the pixel window, a right side horizontal differences value using pixels aligned with and to the right of the current pixel in the pixel window, a top side vertical differences value using pixels aligned with and above the current pixel in the pixel window, and a bottom side vertical differences value using pixels aligned with and below the current pixel in the pixel window, generating a vertical differences value for the pixel window using the top and bottom side vertical differences values and a horizontal differences value for the pixel window using the left and right side horizontal differences values, and selecting the horizontal interpolation mode in response to the horizontal differences value being less than the vertical differences value times a color tolerance factor that is less than one, selecting the vertical interpolation mode in response to the vertical differences value being less than the horizontal differences value times the color tolerance factor, or selecting the blend interpolation mode otherwise, and interpolating a second color for the current pixel using the selected interpolation mode.

In one or more tenth embodiments, further to the ninth embodiments, the vertical differences value is a weighted sum of a minimum of the top and bottom side vertical differences values and a maximum of the top and bottom side vertical differences values, and wherein the horizontal differences value is a weighted sum of a minimum of the left and right side horizontal differences values and a maximum of the left and right side horizontal differences values.

In one or more eleventh embodiments, further to the ninth or tenth embodiments, the method further comprises selecting the horizontal interpolation mode in response to the horizontal differences value being less than the vertical differences value and each pixel within a 3×3 window of the current pixel having a greater vertical differences value than horizontal differences value and the color filter array image being a low or medium noise image.

In one or more twelfth embodiments, further to the ninth through eleventh embodiments, the method further comprises selecting the vertical interpolation mode in response to the vertical differences value being less than the horizontal differences value and each pixel within a 3×3 window of the current pixel having a greater horizontal differences value than vertical differences value and the color filter array image being a low or medium noise image.

In one or more thirteenth embodiments, further to the ninth through twelfth embodiments, the pixel window comprises a 7×7 pixel window, and wherein the left side horizontal differences value, the right side horizontal differences value, the top side vertical differences value, and the bottom side vertical differences value are generated using only pixels of the first color.

In one or more fourteenth embodiments, further to the ninth through thirteenth embodiments, the pixel window comprises a 5×5 pixel window, and wherein the left side horizontal differences value, the right side horizontal differences value, the top side vertical differences value, and the bottom side vertical differences value are generated using pixels of the first color, the second color, and a third color.

In one or more fifteenth embodiments, further to the ninth through fourteenth embodiments, the method further comprises selecting a size of the pixel window based on an image noise of the color filter array image and a minimum of horizontal color differences and vertical color differences within a 5×5 window of the current pixel, wherein the horizontal and vertical color differences are generated using only pixels of the first color.

In one or more sixteenth embodiments, further to the ninth through fifteenth embodiments, the method further comprises outputting a full color image comprising the second color for the current pixel.

In one or more seventeenth embodiments, a method for demosaicing comprises determining, for a current pixel of a color filter array image, a first distortion value for an acute angle relative to a first direction along a horizontal of the color filter array image and a second distortion value for the acute angle relative to a second direction, opposite the first direction, along the horizontal, detecting the current pixel has a corresponding angle substantially aligned with the acute angle along the first direction based on the first distortion value times a factor being less than the second distortion value, directionally filtering a color value of the current pixel to generate an output color value for the current pixel, wherein the directional filtering is substantially aligned with the corresponding angle, and outputting a full color image comprising the output color value.

In one or more eighteenth embodiments, further to the seventeenth embodiments, the method further comprises determining, for the current pixel, a third distortion value for a second acute angle relative to the first direction and a fourth distortion value for the second acute angle relative to the second direction, wherein detecting the pixel has the corresponding angle is responsive to the first distortion value times the factor being less than the second distortion value or the third distortion value times the factor being less than the fourth distortion value.

In one or more nineteenth embodiments, further to the seventeenth or eighteenth embodiments, the acute angle is 27 degrees and the second acute angle is 63 degrees.

In one or more twentieth embodiments, further to the seventeenth through nineteenth embodiments, the method further comprises determining, for a second pixel of a color filter array image, a third distortion value for the acute angle relative to the first direction, a fourth distortion value for the acute angle relative to the second direction, a fifth distortion value for a second acute angle relative to the first direction and a sixth distortion value for the second acute angle relative to the second direction and skipping directional filtering of the second pixel in response to the third distortion value times the factor being less than the fourth distortion value and the fifth distortion value times a second factor being greater than the sixth distortion value, wherein the second factor is greater than the factor.

In one or more twenty-first embodiments, further to the seventeenth through twentieth embodiments, the acute angle is one of 27 or 63 degrees and the second acute angle is 45 degrees.

In one or more twenty-second embodiments, further to the seventeenth through twenty-first embodiments, the first pixel is a red pixel and determining the first distortion value comprises interpolating an interpolated green pixel based on the acute angle and differencing a first green pixel that is a secondary neighbor of the red pixel and the interpolated green pixel.

In one or more twenty-third embodiments, further to the seventeenth through twenty-second embodiments, directionally filtering the color value comprises applying a multi-tap filter selected based on one of the acute angle or one or more other acute angles relative the first direction having a lowest distortion value.

In one or more twenty-fourth embodiments, further to the seventeenth through twenty-third embodiments, the method further comprises verifying, prior to the directional filtering, each of a pixel above, a pixel below, a pixel to the right, and a pixel to the left of the current pixel all have the same angle corresponding thereto.

In one or more twenty-fifth embodiments, a device or system includes a memory and a processor to perform a method according to any one of the above embodiments.

In one or more twenty-sixth embodiments, at least one machine readable medium includes a plurality of instructions that in response to being executed on a computing device, cause the computing device to perform a method according to any one of the above embodiments.

In one or more twenty-seventh embodiments, an apparatus includes means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A method for demosaicing comprising:
   receiving a color filter array image, wherein the color filter array image comprises a current pixel of a first color at a center of a pixel neighborhood around the current pixel, the pixel neighborhood comprising first neighbor pixels of the first color, second neighbor pixels of a second color, and third neighbor pixels of a third color;
   determining, for the current pixel, a current pixel minimum difference value based on differences between the current pixel and the first neighbor pixels within the neighborhood;
   determining, for the current pixel, a first color maximum difference value based on differences between the first neighbor pixels within the neighborhood;
   detecting the current pixel as a warm pixel in response to the first color maximum difference value being less than the current pixel minimum difference value, a noise level of the color filter array image exceeding a first threshold, and the first color maximum difference value and the current pixel minimum difference value both being less than a second threshold; and
   correcting the current pixel to a corrected current pixel in response to the current pixel being detected as a warm pixel.

2. The method of claim 1, wherein the current pixel minimum difference value comprises a minimum of absolute value differences between the current pixel and each of the first neighbor pixels within the neighborhood and the first color maximum difference value comprises a maximum of absolute value differences between each horizontal and vertical pair of the first neighbor pixels exclusive of the current pixel.

3. The method of claim 1, further comprising:
   counting each instance of a difference between the current pixel and one of the first neighbor pixels exceeding a difference between the current pixel and an intervening pixel of one of the second neighbor pixels or third neighbor pixels between the current pixel and the one of the first neighbor pixels to generate a count; and
   resetting the current pixel from the corrected current pixel in response to the count exceeding a threshold.

4. The method of claim 1, further comprising:
   determining a second current pixel minimum difference value based on differences between the current pixel and the second and third neighbor pixels within the neighborhood that are immediate neighbors of the current pixel; and
   resetting the current pixel from the corrected current pixel in response to the current pixel minimum difference value exceeding the second current pixel minimum difference value and the noise level of the color filter array image exceeding a third threshold greater than the first threshold.

5. The method of claim 1, wherein the corrected current pixel comprises an average of at least some of the first neighbor pixels and the method further comprises:
   outputting a full color image comprising the corrected current pixel value.

6. The method of claim 1, further comprising:
   determining a horizontal and a vertical second order first color gradient value for the neighborhood based on minimums of differences between the differences between the first neighbor pixels within the neighborhood exclusive of the current pixel;
determining a horizontal and a vertical second order current pixel based gradient value for the current pixel based on minimums of differences between the differences between the current pixel and the first neighbor pixels and the differences between the first neighbor pixels;
detecting the current pixel as a hot pixel in response to, when the horizontal second order first color gradient value is less than the vertical second order first color gradient value, a maximum of the current pixel and the first neighbor pixels multiplied by a factor being less than the horizontal second order first color gradient value; and
correcting the current pixel to a second corrected current pixel in response to the current pixel being detected as a hot pixel.

7. The method of claim 6, further comprising:
detecting the current pixel as a hot pixel in response to, when the horizontal second order first color gradient value exceeds the vertical second order first color gradient value, the horizontal second order first color gradient value multiplied by a second factor being less than the horizontal second order first color gradient value, wherein the second factor is greater than the factor.

8. The method of claim 6, further comprising:
determining a first layer average as an average of second and third neighbor pixels immediately neighboring the current pixel, a second layer average as an average of the first, second, and third neighbor pixels that are secondary neighbors of the current pixel, and a second layer first color average as an average of the first neighbor pixels that are secondary neighbors of the current pixel; and
resetting the current pixel from the second corrected current pixel in response to the second layer first color average multiplied by a second factor exceeding the current pixel and the first layer average multiplied by a third factor exceeding the second layer average multiplied by a fourth factor.

9. A method for demosaicing comprising:
receiving a color filter array image, wherein the color filter array image comprises a current pixel of a first color at a center of a pixel window around the current pixel, the pixel window comprising a plurality of pixels;
selecting one of a horizontal, vertical, or blend interpolation mode for the current pixel by:
  determining a left side horizontal differences value using pixels aligned with and to the left of the current pixel in the pixel window, a right side horizontal differences value using pixels aligned with and to the right of the current pixel in the pixel window, a top side vertical differences value using pixels aligned with and above the current pixel in the pixel window, and a bottom side vertical differences value using pixels aligned with and below the current pixel in the pixel window;
  generating a vertical differences value for the pixel window using the top and bottom side vertical differences values and a horizontal differences value for the pixel window using the left and right side horizontal differences values; and
  selecting the horizontal interpolation mode in response to the horizontal differences value being less than the vertical differences value times a color tolerance factor that is less than one, selecting the vertical interpolation mode in response to the vertical differences value being less than the horizontal differences value times the color tolerance factor, or selecting the blend interpolation mode otherwise; and
interpolating a second color for the current pixel using the selected interpolation mode.

10. The method of claim 9, wherein the vertical differences value is a weighted sum of a minimum of the top and bottom side vertical differences values and a maximum of the top and bottom side vertical differences values, and wherein the horizontal differences value is a weighted sum of a minimum of the left and right side horizontal differences values and a maximum of the left and right side horizontal differences values.

11. The method of claim 9, further comprising:
selecting the horizontal interpolation mode in response to the horizontal differences value being less than the vertical differences value and each pixel within a 3×3 window of the current pixel having a greater vertical differences value than horizontal differences value and the color filter array image being a low or medium noise image.

12. The method of claim 11, further comprising:
selecting the vertical interpolation mode in response to the vertical differences value being less than the horizontal differences value and each pixel within a 3×3 window of the current pixel having a greater horizontal differences value than vertical differences value and the color filter array image being a low or medium noise image.

13. The method of claim 9, wherein the pixel window comprises a 7×7 pixel window, and wherein the left side horizontal differences value, the right side horizontal differences value, the top side vertical differences value, and the bottom side vertical differences value are generated using only pixels of the first color.

14. The method of claim 9, wherein the pixel window comprises a 5×5 pixel window, and wherein the left side horizontal differences value, the right side horizontal differences value, the top side vertical differences value, and the bottom side vertical differences value are generated using pixels of the first color, the second color, and a third color.

15. The method of claim 9, further comprising:
selecting a size of the pixel window based on an image noise of the color filter array image and a minimum of horizontal color differences and vertical color differences within a 5×5 window of the current pixel, wherein the horizontal and vertical color differences are generated using only pixels of the first color.

16. The method of claim 9, further comprising:
outputting a full color image comprising the second color for the current pixel.

17. A method for demosaicing comprising:
determining, for a current pixel of a color filter array image, a first distortion value for an acute angle relative to a first direction along a horizontal of the color filter array image and a second distortion value for the acute angle relative to a second direction, opposite the first direction, along the horizontal;
detecting the current pixel has a corresponding angle substantially aligned with the acute angle along the first direction based on the first distortion value times a factor being less than the second distortion value;
directionally filtering a color value of the current pixel to generate an output color value for the current pixel, wherein the directional filtering is substantially aligned with the corresponding angle; and outputting a full color image comprising the output color value.

18. The method of claim 17, further comprising:

determining, for the current pixel, a third distortion value for a second acute angle relative to the first direction and a fourth distortion value for the second acute angle relative to the second direction, wherein detecting the pixel has the corresponding angle is responsive to the first distortion value times the factor being less than the second distortion value or the third distortion value times the factor being less than the fourth distortion value.

19. The method of claim 18, wherein the acute angle is 27 degrees and the second acute angle is 63 degrees.

20. The method of claim 17, further comprising:

determining, for a second pixel of a color filter array image, a third distortion value for the acute angle relative to the first direction, a fourth distortion value for the acute angle relative to the second direction, a fifth distortion value for a second acute angle relative to the first direction and a sixth distortion value for the second acute angle relative to the second direction; and skipping directional filtering of the second pixel in response to the third distortion value times the factor being less than the fourth distortion value and the fifth distortion value times a second factor being greater than the sixth distortion value, wherein the second factor is greater than the factor.

21. The method of claim 20, wherein the acute angle is one of 27 or 63 degrees and the second acute angle is 45 degrees.

22. The method of claim 17, wherein the first pixel is a red pixel and determining the first distortion value comprises interpolating an interpolated green pixel based on the acute angle and differencing a first green pixel that is a secondary neighbor of the red pixel and the interpolated green pixel.

23. The method of claim 17, wherein directionally filtering the color value comprises applying a multi-tap filter selected based on one of the acute angle or one or more other acute angles relative the first direction having a lowest distortion value.

24. The method of claim 17, further comprising:

verifying, prior to the directional filtering, each of a pixel above, a pixel below, a pixel to the right, and a pixel to the left of the current pixel all have the same angle corresponding thereto.

* * * * *